US012087201B2

(12) United States Patent
He et al.

(10) Patent No.: US 12,087,201 B2
(45) Date of Patent: Sep. 10, 2024

(54) DISPLAY SCREEN ADJUSTMENT METHOD AND APPARATUS, AND DEVICE

(71) Applicant: HUAWEI TECHNOLOGIES CO., LTD., Guangdong (CN)

(72) Inventors: Hu He, Dongguan (CN); Shipeng Chi, Shenzhen (CN); Ruhai Fu, Dongguan (CN); Chaorong Liang, Dongguan (CN); Chiaching Chu, Shenzhen (CN); Zhongyu He, Osaka (JP)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 17/919,000

(22) PCT Filed: Mar. 24, 2021

(86) PCT No.: PCT/CN2021/082734
§ 371 (c)(1),
(2) Date: Oct. 14, 2022

(87) PCT Pub. No.: WO2021/208689
PCT Pub. Date: Oct. 21, 2021

(65) Prior Publication Data

US 2023/0237948 A1 Jul. 27, 2023

(30) Foreign Application Priority Data

Apr. 15, 2020 (CN) ......................... 202010294740.6

(51) Int. Cl.
*G09G 3/20* (2006.01)

(52) U.S. Cl.
CPC ... *G09G 3/2007* (2013.01); *G09G 2320/0233* (2013.01); *G09G 2320/0626* (2013.01); *G09G 2360/144* (2013.01); *G09G 2360/16* (2013.01)

(58) Field of Classification Search
None
See application file for complete search history.

(56) References Cited

U.S. PATENT DOCUMENTS

2009/0256974 A1 10/2009 Mukai
2018/0096660 A1* 4/2018 Liu ..................... G02F 1/13338
(Continued)

FOREIGN PATENT DOCUMENTS

CN 104916259 A 9/2015
CN 106484354 A 3/2017
(Continued)

*Primary Examiner* — Christopher R Lamb
(74) *Attorney, Agent, or Firm* — WOMBLE BOND DICKINSON (US) LLP

(57) ABSTRACT

A display screen adjustment method and apparatus, and a device are provided. A display screen includes a first display area and a second display area, a camera component is disposed under the first display area, and light transmittance of the first display area is higher than light transmittance of the second display area. The adjustment method includes: collecting present ambient illuminance on a terminal; and when the ambient illuminance is lower than an ambient illuminance threshold, adjusting, based on a first ambient light adaptation adjustment curve, luminance corresponding to grayscale 255 of the first display area to first luminance, and adjusting, based on a second ambient light adaptation adjustment curve, luminance corresponding to grayscale 255 of the second display area to second luminance, where the first luminance is approximately equal to the second luminance.

18 Claims, 11 Drawing Sheets

(56) References Cited

U.S. PATENT DOCUMENTS

| | | | | |
|---|---|---|---|---|
| 2020/0098318 | A1* | 3/2020 | Liu | G09G 3/3291 |
| 2020/0135147 | A1* | 4/2020 | Tang | G09G 5/10 |
| 2020/0211480 | A1* | 7/2020 | Xiang | G09G 3/3406 |
| 2020/0234634 | A1* | 7/2020 | Li | G09G 3/3208 |

FOREIGN PATENT DOCUMENTS

| | | | |
|---|---|---|---|
| CN | 108717244 | A | 10/2018 |
| CN | 108810200 | A | 11/2018 |
| CN | 110164398 | A | 8/2019 |
| CN | 110288946 | A | 9/2019 |
| CN | 110570830 | A | 12/2019 |
| CN | 110619836 | A | 12/2019 |
| CN | 110634434 | A | 12/2019 |
| CN | 110930945 | A | 3/2020 |

* cited by examiner

DISPLAY SCREEN ADJUSTMENT METHOD AND APPARATUS, AND DEVICE

CROSS-REFERENCE TO RELATED APPLICATIONS

This application is a national stage of International Application No. PCT/CN2021/082734, filed on Mar. 24, 2021, which claims priority to Chinese Patent Application No. 202010294740.6, filed on Apr. 15, 2020. Both of the aforementioned applications are hereby incorporated by reference in their entireties.

TECHNICAL FIELD

This application relates to the field of terminal technologies, and in particular, to a display screen adjustment method and apparatus, and a device.

BACKGROUND

After a concept of terminal bezel-less screen is introduced, to increase a screen-to-body ratio of a terminal screen, an initially used notch screen is replaced by a waterdrop notch screen, and then a punch-hole screen is used. Increasing the screen-to-body ratio of the terminal screen is a trend in the terminal industry. A camera and under display optical sensors have different light transmittance requirements for the terminal screen. Therefore, to enable areas in which the under display optical sensors are disposed to meet the light transmittance requirements of the camera and the under display optical sensors and to normally implement screen display, so as to improve the screen-to-body ratio of the terminal screen, usually, several high-light-transmittance display areas are disposed on the screen, and the camera and the under display optical sensors are disposed under the several high-light-transmittance display areas. Light transmittance of the screen is improved by reducing resolution of the several high-light-transmittance display areas, or in another equivalent manner. As a result, the several high-light-transmittance display areas can meet the light transmittance requirements of the camera and the under display optical sensors, and can implement normal screen display. Therefore, the screen-to-body ratio of the terminal screen is effectively improved.

However, for a terminal provided with several high-light-transmittance display areas, luminance of the several high-light-transmittance display areas and luminance of other non-high-light-transmittance display areas are determined based on ambient light adaptation adjustment curves stored in the terminal. The ambient light adaptation adjustment curve indicates a mapping relationship between ambient illuminance and a pulse width modulation (PWM) ratio or a current ratio corresponding to grayscale 255 of a display area. In this case, when the luminance of the several high-light-transmittance display areas and the luminance of the other non-high-light-transmittance display areas are adjusted based on the ambient light adaptation adjustment curves, although ratios corresponding to same ambient illuminance are the same, because the luminance of the several high-light-transmittance display areas is different from the luminance of the other non-high-light transmittance display areas, regardless of an ambient illuminance scenario, the luminance of the several high-light-transmittance display areas is always lower than luminance of other display areas on the terminal screen.

Therefore, when a user uses the terminal in an ambient illuminance scenario, for example, an indoor scenario or a night scenario, that is, the terminal is in a scenario with low ambient illuminance such as an indoor scenario or a night scenario, the luminance of the several high-light-transmittance display areas is lower than the luminance of other display areas on the terminal screen. As a result, a display effect of the terminal screen is poor.

SUMMARY

Embodiments of this application provide a display screen adjustment method and apparatus, and device, to improve a display effect of a terminal screen during screen display.

According to a first aspect, an embodiment of this application provides a display screen adjustment method applied to a terminal, where a screen of the terminal includes a first display area and a second display area, a camera component is disposed under the first display area, light transmittance of the first display area is higher than light transmittance of the second display area, and the display screen adjustment method may include:

collecting present ambient illuminance on the terminal; and when the ambient illuminance is lower than an ambient illuminance threshold, adjusting, based on a first ambient light adaptation adjustment curve, luminance corresponding to grayscale 255 of the first display area to first luminance, and adjusting, based on a second ambient light adaptation adjustment curve, luminance corresponding to grayscale 255 of the second display area to second luminance, where the first luminance is approximately equal to the second luminance.

The first ambient light adaptation adjustment curve indicates a mapping relationship between ambient illuminance and the luminance corresponding to the grayscale 255 of the first display area; and the second ambient light adaptation adjustment curve indicates a mapping relationship between ambient illuminance and the luminance corresponding to the grayscale 255 of the second display area.

It can be learned that, in an embodiment of the application, when the ambient illuminance is lower than the ambient illuminance threshold, the luminance corresponding to the grayscale 255 of the first display area is adjusted based on the first ambient light adaptation adjustment curve indicating the mapping relationship between the ambient illuminance and the luminance corresponding to the grayscale 255 of the first display area, and the luminance corresponding to the grayscale 255 of the second display area is adjusted based on the second ambient light adaptation adjustment curve indicating the mapping relationship between the ambient illuminance and the luminance corresponding to the grayscale 255 of the second display area. That is, ambient light adaptation adjustment curves of multiple levels are set to adjust the luminance corresponding to the grayscale 255 of the first display area and the luminance corresponding to the grayscale 255 of the second display area respectively, so that luminance corresponding to the grayscale 255 of the first display area, obtained through adjustment, is controlled to be approximately equal to luminance corresponding to the grayscale 255 of the second display area obtained through adjustment. In this way, a problem of uneven luminance of the first display area and the second display area on the terminal screen can be effectively resolved, and a display effect of the terminal screen can be improved.

In an embodiment, the first ambient light adaptation adjustment curve is the curve indicating the relationship between the ambient illuminance and the luminance corresponding to the grayscale 255 of the first display area, the second ambient light adaptation adjustment curve is the curve indicating the relationship between the ambient illuminance and the luminance corresponding to the grayscale 255 of the second display area, and a slope of the first ambient light adaptation adjustment curve is approximately equal to a slope of the second ambient light adaptation adjustment curve when the ambient illuminance is lower than the ambient illuminance threshold. In this way, the luminance corresponding to the grayscale 255 of the first display area, obtained through adjustment, is the same as the luminance corresponding to the grayscale 255 of the second display area obtained through adjustment. As a result, the problem of uneven luminance of the first display area and the second display area on the terminal screen can be resolved, and the display effect of the terminal screen can be improved.

In an embodiment, the display screen adjustment method may further include:

determining the second ambient light adaptation adjustment curve based on at least two groups consisted of ambient illuminance and luminance corresponding to the ambient illuminance; performing conversion on the second ambient light adaptation adjustment curve to obtain a second ratio curve, where the second ratio curve is a curve indicating a relationship between ambient illuminance and a pulse width modulation ratio corresponding to the grayscale 255 of the second display area, or the second ratio curve is a curve indicating a relationship between ambient illuminance and a current ratio corresponding to the grayscale 255 of the second display area; and obtaining the first ambient light adaptation adjustment curve based on the ambient illuminance threshold, maximum luminance corresponding to the grayscale 255 of the first display area, and the second ratio curve.

Usually, the first ambient light adaptation adjustment curve is a monotonic curve, and may be described from a perspective of slope. In an ideal condition, for the first ambient light adaptation adjustment curve, when the ambient illuminance is lower than the ambient illuminance threshold, the relationship between the ambient illuminance and the luminance corresponding to the grayscale 255 of the first display area may be represented by a straight-line segment. Similarly, the second ambient light adaptation adjustment curve is a monotonic curve, and may be described from a perspective of slope. In an ideal condition, for the second ambient light adaptation adjustment curve, when the ambient illuminance is lower than the ambient illuminance threshold, the relationship between the ambient illuminance and the luminance corresponding to the grayscale 255 of the second display area may be represented by a straight-line segment.

In an embodiment, the obtaining the first ambient light adaptation adjustment curve based on the ambient illuminance threshold, maximum luminance corresponding to the grayscale 255 of the first display area, and the second ratio curve may include:

obtaining a first ratio curve based on the ambient illuminance threshold, the maximum luminance corresponding to the grayscale 255 of the first display area, and the second ratio curve, where a slope of the first ratio curve is greater than a slope of the second ratio curve; and when the second ratio curve is the curve indicating the relationship between the ambient illuminance and the pulse width modulation ratio corresponding to the grayscale 255 of the second display area, the first ratio curve is a curve indicating a relationship between ambient illuminance and a pulse width modulation ratio corresponding to the grayscale 255 of the first display area; or when the second ratio curve is the curve indicating the relationship between the ambient illuminance and the current ratio corresponding to the grayscale 255 of the second display area, the first ratio curve is a curve indicating a relationship between ambient illuminance and a current ratio corresponding to the grayscale 255 of the first display area; and obtaining the first ambient light adaptation adjustment curve based on the first ratio curve. In this way, the luminance corresponding to the grayscale 255 of the first display area may be adjusted based on the first ambient light adaptation adjustment curve, so that the first luminance corresponding to the grayscale 255 of the first display area obtained through adjustment is the same as the second luminance corresponding to the grayscale 255 of the second display area obtained through adjustment. This avoids a poor display effect of the terminal screen caused by uneven luminance of the first display area and the second display area on the terminal screen, and therefore improving the display effect of the terminal screen.

In an embodiment, in a process of determining the ambient illuminance threshold, because a physical capability of a component in the first display area cannot be exceeded, maximum luminance of the first display area is the maximum luminance corresponding to the grayscale 255 of the first display area. Therefore, ambient illuminance that is on the second ambient light adaptation curve and that corresponds to illuminance equal to the maximum luminance corresponding to the grayscale 255 of the first display area may be determined as the ambient illuminance threshold. That is, the ambient illuminance threshold is ambient illuminance that is on the second ambient light adaptation adjustment curve and that corresponds to luminance equal to the maximum luminance corresponding to the grayscale 255 of the first display area.

In an embodiment, when the first ambient light adaptation adjustment curve is a first ratio curve, the second ambient light adaptation adjustment curve is a second ratio curve, and the ambient illuminance is lower than the ambient illuminance threshold, a slope of the first ratio curve is greater than a slope of the second ratio curve.

When the first ratio curve is a curve indicating a relationship between ambient illuminance and a pulse width modulation ratio corresponding to the grayscale 255 of the first display area, the second ratio curve is a curve indicating a relationship between ambient illuminance and a pulse width modulation ratio corresponding to the grayscale 255 of the second display area; or when the first ratio curve is a curve indicating a relationship between ambient illuminance and a current ratio corresponding to the grayscale 255 of the first display area, the second ratio curve is a curve indicating a relationship between ambient illuminance and a current ratio corresponding to the grayscale 255 of the second display area.

It can be learned that, in an embodiment of the application, when the luminance of the first display area and the luminance of the second display area on the terminal screen need to be adjusted, the present ambient illuminance on the terminal may be first collected, and then compared with the ambient illuminance threshold. When the ambient illuminance is lower than the ambient illuminance threshold, the luminance corresponding to the grayscale 255 of the first display area may be adjusted based on the first ratio curve, and the luminance corresponding to the grayscale 255 of the second display area is adjusted based on the second ratio curve. That is, ratio curves of multiple levels are set to adjust the luminance corresponding to the grayscale 255 of the first display area and the luminance corresponding to the grayscale 255 of the second display area respectively, so that the luminance corresponding to the grayscale 255 of the first display area obtained through adjustment is controlled to be approximately equal to the luminance corresponding to the grayscale 255 of the second display area obtained through adjustment. In this way, the problem of uneven luminance of the first display area and the second display area on the terminal screen can be effectively resolved, and the display effect of the terminal screen can be improved.

In an embodiment, the display screen adjustment method may further include:

determining, based on at least two groups consisted of ambient illuminance and luminance corresponding to the ambient illuminance, a curve indicating a relationship between ambient illuminance and the luminance corresponding to the grayscale 255 of the second display area; and performing conversion on the curve indicating the relationship between the ambient illuminance and the luminance corresponding to the grayscale 255 of the second display area, to obtain the second ratio curve; and obtaining the first ratio curve based on the ambient illuminance threshold, maximum luminance corresponding to the grayscale 255 of the first display area, and the second ratio curve. In this way, the luminance corresponding to the grayscale 255 of the first display area may be adjusted based on the first ratio curve, so that the first luminance corresponding to the grayscale 255 of the first display area obtained through adjustment is the same as the second luminance corresponding to the grayscale 255 of the second display area obtained through adjustment. This avoids a poor display effect of the terminal screen caused by uneven luminance of the first display area and the second display area on the terminal screen, and therefore improving a display effect of the terminal screen.

In an embodiment, in a process of determining the ambient illuminance threshold, because a physical capability of a component in the first display area cannot be exceeded, when the ratio curve is a curve indicating a relationship between ambient illuminance and a pulse width modulation ratio corresponding to grayscale 255 of a display area, a maximum pulse width modulation ratio of the first display area can only be adjusted to a maximum pulse width modulation ratio corresponding to the grayscale 255 of the first display area. In other words, the ambient illuminance threshold is ambient illuminance that is on the second ratio curve and that corresponds to a pulse width modulation ratio equal to the maximum pulse width modulation ratio corresponding to the grayscale 255 of the first display area. Alternatively, when the ratio curve is the curve indicating the relationship between ambient illuminance and a current ratio corresponding to grayscale 255 of a display area, a maximum current ratio of the first display area can only be adjusted to a maximum current ratio corresponding to the grayscale 255 of the first display area. In other words, the ambient illuminance threshold is ambient illuminance that is on the second ratio curve and that corresponds to a current ratio equal to the maximum current ratio corresponding to the grayscale 255 of the first display area.

In an embodiment, in the case where the ambient illuminance is higher than or equal to the ambient illuminance threshold, when the first luminance reaches the maximum luminance corresponding to the grayscale 255 of the first display area, the first luminance stops increasing with increase of the ambient illuminance, and maintains at the maximum luminance, to prevent a physical capability of the display area from being exceeded due to the luminance increase. This ensures security of the component in the first display area. In view of the above consideration, if present ambient illuminance on the terminal is high, for example, when the terminal is in a high-light scenario in which ambient illuminance is high, and luminance corresponding to the ambient illuminance is the maximum luminance corresponding to the grayscale 255 of the first display area, given that naked eyes are weak at sensing screen luminance of different intensities, the following adjustments are made to prevent a physical capability of the terminal from being exceeded, to ensure the security of the component in the first display area. When the ambient illuminance is higher than or equal to the ambient illuminance threshold, for the first display area, the first luminance of the first display area may be controlled, based on the physical capability of the component in the first display area, to maintain at the maximum luminance corresponding to the grayscale 255 of the first display area, and does not increase with the increase of the ambient illuminance; however, for the second display area, adjustment to the second luminance of the second display area may be continued, and the second luminance of the second display area increases with the increase of the ambient illuminance until the luminance of the second display area increases to maximum luminance corresponding to the grayscale 255 of the second display area. In addition, in the entire adjustment process, the second luminance of the second display area is always higher than the first luminance of the first display area.

In an embodiment, the adjusting, based on a first ambient light adaptation adjustment curve, luminance corresponding to grayscale 255 of the first display area to first luminance, and adjusting, based on a second ambient light adaptation adjustment curve, luminance corresponding to grayscale 255 of the second display area to second luminance may include:

obtaining a present operation interface of the terminal, where the operation interface includes any one of a screen-off operation interface, a screen-on operation interface, or a screen lock operation interface; and adjusting, based on the present operation interface of the terminal and the first ambient light adaptation adjustment curve, the luminance corresponding to the grayscale 255 of the first display area to third luminance, and adjusting, based on the present operation interface of the terminal and the second ambient light adaptation adjustment curve, the luminance corresponding to the grayscale 255 of the second display area to fourth luminance, where the third luminance is approximately equal to the fourth luminance, and the third luminance is higher than or equal to the first luminance.

It can be learned that generally, by using the adjustment method, the problem of uneven luminance of the first display area and the second display area on the terminal screen can be resolved, so that the display effect of the terminal screen can be improved, and the flexibility of terminal screen adjustment is improved because the present operation interface of the terminal can be considered.

In an embodiment, the adjusting, based on a first ambient light adaptation adjustment curve, luminance corresponding to grayscale 255 of the first display area to first luminance, and adjusting, based on a second ambient light adaptation adjustment curve, luminance corresponding to grayscale 255 of the second display area to second luminance may include:

obtaining a present working mode of the terminal, where the working mode is a Do Not Disturb mode or a non-Do Not Disturb mode; and adjusting, based on the present working mode of the terminal and the first ambient light adaptation adjustment curve, the luminance corresponding to the grayscale 255 of the first display area to fifth luminance, and adjusting, based on the present working mode of the terminal and the second ambient light adaptation adjustment curve, the luminance corresponding to the grayscale 255 of the second display area to sixth luminance, where the fifth luminance is approximately equal to the sixth luminance, and the fifth luminance is higher than or equal to the first luminance.

It can be learned that generally, by using the adjustment method, a problem of uneven luminance of the first display area and the second display area on the terminal screen can be resolved, so that the display effect of the terminal screen can be improved, and the flexibility of terminal screen adjustment is improved because the present working mode of the terminal is considered.

According to a second aspect, an embodiment of this application further provides a display screen adjustment apparatus applied to a terminal, where a screen of the terminal includes a first display area and a second display area, a camera component is disposed under the first display area, light transmittance of the first display area is higher than light transmittance of the second display area, and the display screen adjustment apparatus may include:

a collection unit, configured to collect present ambient illuminance on the terminal; and a processing unit, configured to: when the ambient illuminance is lower than an ambient illuminance threshold, adjust, based on a first ambient light adaptation adjustment curve, luminance corresponding to grayscale 255 of the first display area to first luminance, and adjust, based on a second ambient light adaptation adjustment curve, luminance corresponding to grayscale 255 of the second display area to second luminance, where the first luminance is approximately equal to the second luminance.

The first ambient light adaptation adjustment curve indicates a mapping relationship between ambient illuminance and the luminance corresponding to the grayscale 255 of the first display area; and the second ambient light adaptation adjustment curve indicates a mapping relationship between ambient illuminance and the luminance corresponding to the grayscale 255 of the second display area.

In an embodiment, the first ambient light adaptation adjustment curve is the curve indicating the relationship between the ambient illuminance and the luminance corresponding to the grayscale 255 of the first display area, the second ambient light adaptation adjustment curve is the curve indicating the relationship between the ambient illuminance and the luminance corresponding to the grayscale 255 of the second display area, and a slope of the first ambient light adaptation adjustment curve is approximately equal to a slope of the second ambient light adaptation adjustment curve when the ambient illuminance is lower than the ambient illuminance threshold.

In an embodiment, the processing unit is further configured to determine the second ambient light adaptation adjustment curve based on at least two groups consisted of ambient illuminance and luminance corresponding to the ambient illuminance; perform conversion on the second ambient light adaptation adjustment curve to obtain a second ratio curve, where the second ratio curve is a curve indicating a relationship between ambient illuminance and a pulse width modulation ratio corresponding to the grayscale 255 of the second display area, or the second ratio curve is a curve indicating a relationship between ambient illuminance and a current ratio corresponding to the grayscale 255 of the second display area; and obtain the first ambient light adaptation adjustment curve based on the ambient illuminance threshold, maximum luminance corresponding to the grayscale 255 of the first display area, and the second ratio curve.

In an embodiment, the processing unit is configured to: obtain a first ratio curve based on the ambient illuminance threshold, the maximum luminance corresponding to the grayscale 255 of the first display area, and the second ratio curve, where a slope of the first ratio curve is greater than a slope of the second ratio curve; and when the second ratio curve is the curve indicating the relationship between the ambient illuminance and the pulse width modulation ratio corresponding to the grayscale 255 of the second display area, the first ratio curve is a curve indicating a relationship between ambient illuminance and a pulse width modulation ratio corresponding to the grayscale 255 of the first display area; or when the second ratio curve is the curve indicating the relationship between the ambient illuminance and the current ratio corresponding to the grayscale 255 of the second display area, the first ratio curve is a curve indicating a relationship between ambient illuminance and a current ratio corresponding to the grayscale 255 of the first display area; and obtain the first ambient light adaptation adjustment curve based on the first ratio curve.

In an embodiment, the ambient illuminance threshold is ambient illuminance that is on the second ambient light adaptation adjustment curve and that corresponds to luminance equal to the maximum luminance corresponding to the grayscale 255 of the first display area.

In an embodiment, when the first ambient light adaptation adjustment curve is a first ratio curve, the second ambient light adaptation adjustment curve is a second ratio curve, and the ambient illuminance is lower than the ambient illuminance threshold, a slope of the first ratio curve is higher than a slope of the second ratio curve.

When the first ratio curve is a curve indicating a relationship between ambient illuminance and a pulse width modulation ratio corresponding to the grayscale 255 of the first display area, the second ratio curve is a curve indicating a relationship between ambient illuminance and a pulse width modulation ratio corresponding to the grayscale 255 of the second display area; or when the first ratio curve is a curve indicating a relationship between ambient illuminance and a current ratio corresponding to the grayscale 255 of the first display area, the second ratio curve is a curve indicating a relationship between ambient illuminance and a current ratio corresponding to the grayscale 255 of the second display area.

In an embodiment, the processing unit is further configured to: determine, based on at least two groups consisted of ambient illuminance and luminance corresponding to the ambient illuminance, a curve indicating a relationship between ambient illuminance and the luminance corresponding to the grayscale 255 of the second display area; perform conversion on the curve indicating the relationship between the ambient illuminance and the luminance corresponding to the grayscale 255 of the second display area, to obtain the second ratio curve; and obtain the first ratio curve based on the ambient illuminance threshold, maximum luminance corresponding to the grayscale 255 of the first display area, and the second ratio curve.

In an embodiment, the ambient illuminance threshold is ambient illuminance that is on the second ratio curve and that corresponds to a pulse width modulation ratio equal to a maximum pulse width modulation ratio corresponding to the grayscale 255 of the first display area; or the ambient illuminance threshold is ambient illuminance that is on the second ratio curve and that corresponds to a current ratio equal to a maximum current ratio corresponding to the grayscale 255 of the first display area.

In an embodiment, when the ambient illuminance is higher than or equal to the ambient illuminance threshold, the first luminance is maintained at the maximum luminance corresponding to the grayscale 255 of the first display area, and the second luminance is higher than the first luminance, and is less than or equal to maximum luminance corresponding to the grayscale 255 of the second display area.

In an embodiment, the processing unit is configured to: obtain a present operation interface of the terminal, where the operation interface includes any one of a screen-off operation interface, a screen-on operation interface, or a screen lock operation interface; and adjust, based on the present operation interface of the terminal and the first ambient light adaptation adjustment curve, the luminance corresponding to the grayscale 255 of the first display area to third luminance, and adjust, based on the present operation interface of the terminal and the second ambient light adaptation adjustment curve, the luminance corresponding to the grayscale 255 of the second display area to fourth luminance, where the third luminance is approximately equal to the fourth luminance, and the third luminance is higher than or equal to the first luminance.

In an embodiment, the processing unit is configured to: obtain a present working mode of the terminal, where the working mode is a Do Not Disturb mode or a non-Do Not Disturb mode; and adjust, based on the present working mode of the terminal and the first ambient light adaptation adjustment curve, the luminance corresponding to the grayscale 255 of the first display area to fifth luminance, and adjust, based on the present working mode of the terminal and the second ambient light adaptation adjustment curve, the luminance corresponding to the grayscale 255 of the second display area to sixth luminance, where the fifth luminance is approximately equal to the sixth luminance, and the fifth luminance is higher than or equal to the first luminance.

According to a third aspect, an embodiment of this application further provides an electronic device, where the electronic device includes a processor and a memory. The memory stores a computer program, and the processor executes the computer program stored in the memory, so that the electronic device implements the display screen adjustment method according to any possible implementation of the first aspect.

According to a fourth aspect, an embodiment of this application further provides an electronic device, where the electronic device may include a processor and an interface circuit.

The interface circuit is configured to receive code instructions and transmit the code instructions to the processor.

The processor is configured to run the code instructions to perform the display screen adjustment method according to any possible implementation of the first aspect.

According to a fifth aspect, an embodiment of this application further provides a readable storage medium, configured to store instructions. When the instructions are executed, the display screen adjustment method according to any possible implementation of the first aspect is implemented.

According to a sixth aspect, an embodiment of this application further provides a chip, where the chip stores a computer program, and when the computer program is executed by a processor, the display screen adjustment method according to any possible implementation of the first aspect is implemented.

According to the display screen adjustment method and apparatus, and the device that are provided in embodiments of this application, in adjustment of luminance of a display area on a terminal screen, when ambient illuminance is lower than an ambient illuminance threshold, luminance corresponding to grayscale 255 of a first display area is adjusted based on a first ambient light adaptation adjustment curve indicating a mapping relationship between ambient illuminance and the luminance corresponding to the grayscale 255 of the first display area, and luminance corresponding to grayscale 255 of a second display area is adjusted based on a second ambient light adaptation adjustment curve indicating a mapping relationship between ambient illuminance and the luminance corresponding to the grayscale 255 of the second display area. That is, ambient light adaptation adjustment curves of multiple levels are set to adjust the luminance corresponding to the grayscale 255 of the first display area and the luminance corresponding to the grayscale 255 of the second display area respectively, so that luminance of the first display area is controlled to be approximately equal to luminance of the second display area. In this way, uneven luminance of the first display area and the second display area can be avoided, and a display effect of the terminal screen can be improved.

DESCRIPTION OF EMBODIMENTS

A display screen adjustment method provided in embodiments of this application may be applied to a terminal provided with an organic light-emitting diode (OLED) screen, another terminal that may emerge in the future and that can implement area-based screen luminance control, or the like. This is not limited in the embodiments of this application.

The terminal is also referred to as a terminal device or user equipment, and is a device that provides voice and/or data connectivity for a user, for example, a handheld device or a vehicle-mounted device that has a wireless connection function. For example, common terminal devices include a mobile phone, a tablet computer, a notebook computer, a palmtop computer, a mobile internet device (MID), and a wearable device. For example, wearable devices include a smart watch, a smart band, and a pedometer.

In embodiments of this application, "at least one" means one or more, and "a plurality of" means two or more. The term "and/or" describes an association relationship between associated objects and represents that three relationships may exist. For example, A and/or B may represent the following three cases: Only A exists, both A and B exist, and only B exists. A and B may be singular or plural. In the descriptions of this application, the character "/" usually indicates an "or" relationship between the associated objects.

Figure 1:
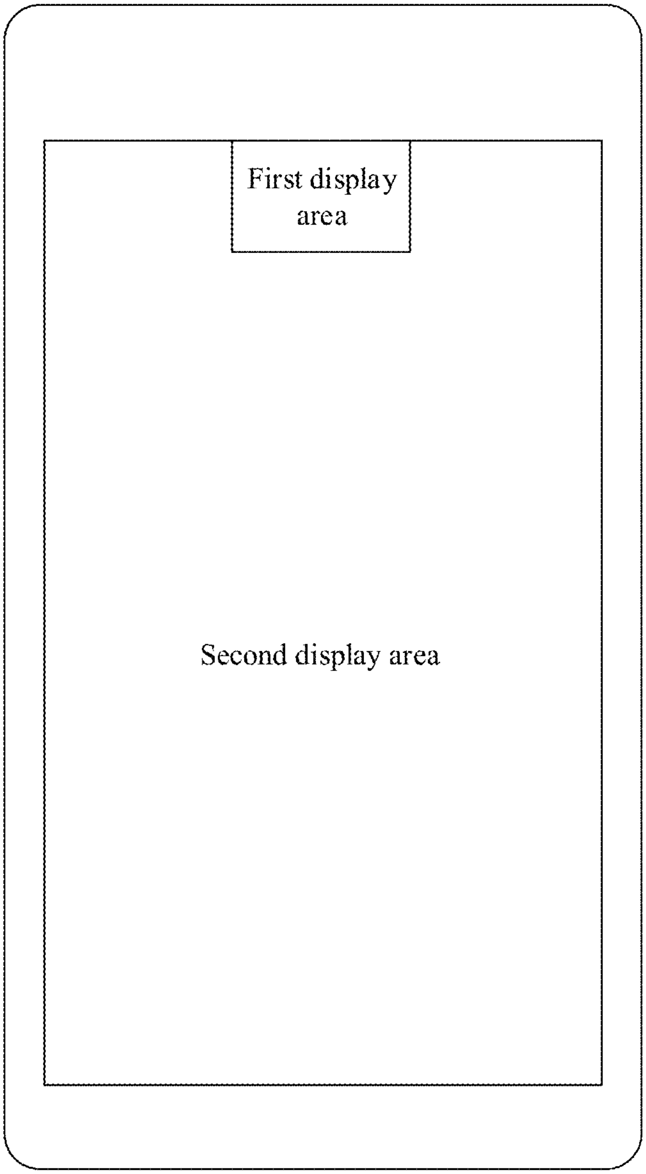
FIG. 1 is a schematic diagram of an applicable terminal according to an embodiment of this application.

FIG. 1 is a schematic diagram of an applicable terminal according to an embodiment of this application. For example, as shown in FIG. 1, for a terminal provided with several high-light-transmittance display areas, the several high-light-transmittance display areas may be denoted as a first display area on a screen of the terminal, and a non-high-light-transmittance display area on the screen of the terminal is denoted as a second display area, where light transmittance of the first display area is higher than light transmittance of the second display area. When luminance of the first display area and luminance of the second display area are adjusted based on ambient light adaption adjustment curves stored in the terminal, although ratios corresponding to same ambient illuminance are the same, because the luminance of the first display area is different from the luminance of the second display area, regardless of ambient illuminance scenario, luminance of the first display area obtained through adjustment based on the ambient light adaption adjustment curve is always lower than luminance of the second display area obtained through adjustment based on the ambient light adaption adjustment curve, which results in a poor display effect of the terminal screen.

Figure 2:
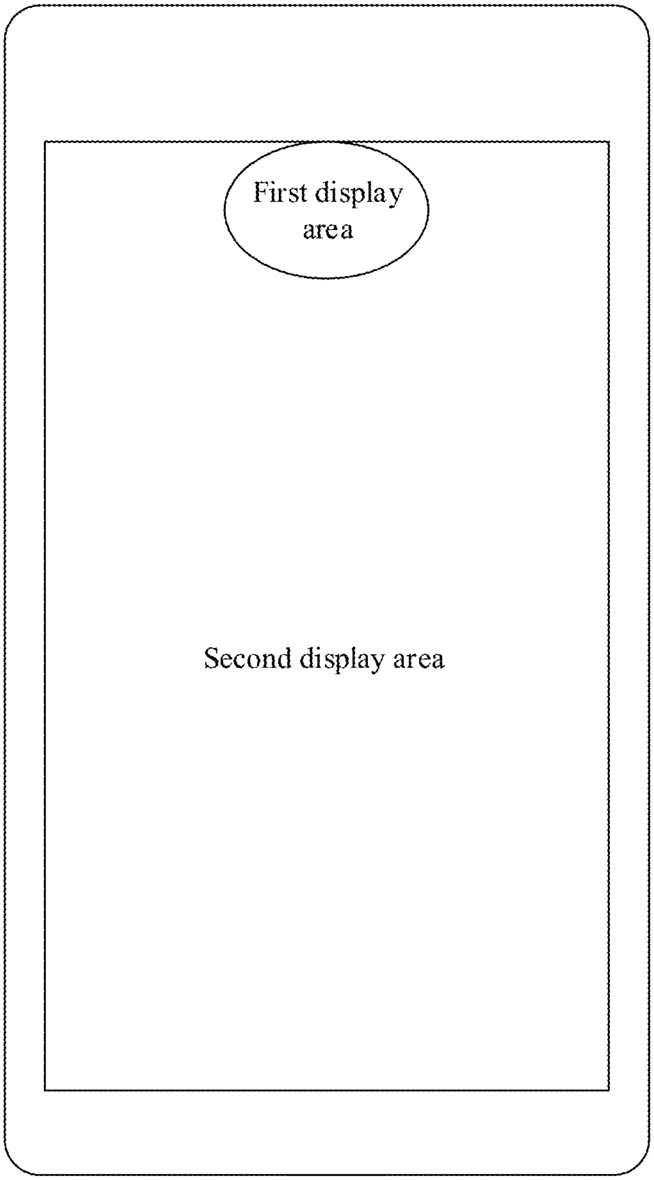
FIG. 2 is a schematic diagram of another applicable terminal according to an embodiment of this application.
Figure 3:
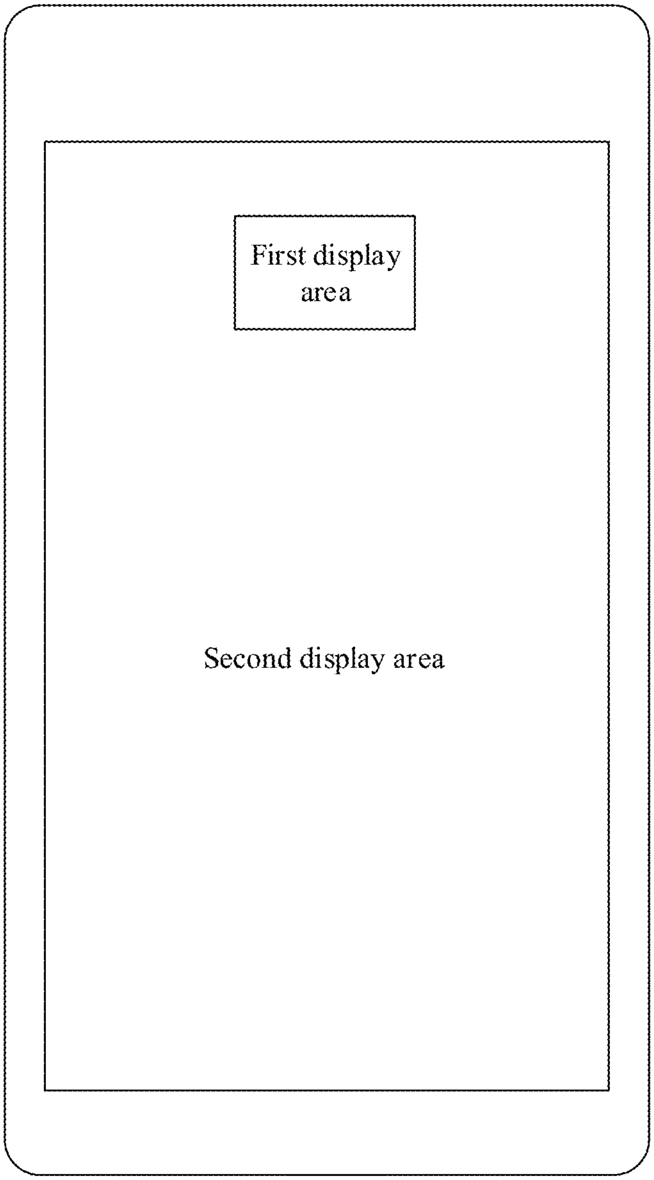
FIG. 3 is a schematic diagram of still another applicable terminal according to an embodiment of this application.

Usually, for the terminal provided with the first display area including the several high-light-transmittance display areas, there are two problems to be considered. One problem is a shape in which the first display area including the several high-light-transmittance display areas is disposed, and the other problem is a position at which the first display area including the several high-light-transmittance display areas is disposed on the screen. For example, the shape of the first display area may be a rectangle, such as the first display area shown in FIG. 1; or the shape of the first display area may be an ellipse as shown in FIG. 2. FIG. 2 is a schematic diagram of another applicable terminal according to an embodiment of this application. A shape of the first display area may be set based on an actual requirement. This is not further limited in embodiments of this application. For the position at which the first display area is disposed on the screen, for example, the first display area may be disposed on the top of a display area of the screen, as shown in FIG. 1; or the first display area may be disposed at a position below the top of the display area of the screen, as shown in FIG. 3. FIG. 3 is a schematic diagram of still another applicable terminal according to an embodiment of this application. A position of the first display area may be disposed based on an actual requirement. This is not further limited in embodiments of this application.

To resolve a problem of uneven luminance on the first display area and the second display area on the screen of the terminal, when the luminance of the first display area and the second display area on the screen of the terminal is adjusted, adjustment may be performed from two aspects. In a first aspect, the luminance of the second display area, which is relatively higher, may be set to a fixed luminance value, and only the luminance of the first display area, which is relatively lower, is increased, so that the luminance of the first display area is the same as that of the second display area. However, if the fixed luminance value of the second display area is higher than maximum luminance of the first display area, because a physical capability of a component in the first display area is limited and cannot be exceeded, the luminance of the first display area is forcibly adjusted to be the same as the luminance of the second display area that has relatively higher luminance. It is clear that making the luminance of the first display area the same as that of the second display area in this manner is inappropriate. In a second aspect, to ensure that the physical capability of the component in the first display area is not exceeded, so as to ensure security of the component in the first display area, when the luminance of the first display area needs to be adjusted, the first display area is controlled to maintain at the maximum luminance of the first display area, and only the luminance of the second display area is reduced, so that the luminance of the first display area is the same as that of the second display area. However, a display effect of the entire second display area is affected, and the luminance of the second display area is poor. Therefore, it is also inappropriate to make the luminance of the first display area same as that of the second display area in this manner.

Based on the foregoing descriptions, after long-term testing, an embodiment of this application provides a display screen adjustment method applied to a terminal, to resolve the problem of uneven luminance of a first display area and a second display area in a terminal screen, so as to improve a display effect of the terminal screen. The terminal screen includes a first display area and a second display area, a camera component is disposed under the first display area, and light transmittance of the first display area is higher than that of the second display area. When luminance of the first display area and luminance of the second display area on the terminal screen need to be adjusted, ambient illuminance on the terminal may be first collected, and the collected ambient illuminance is compared with an ambient illuminance threshold. When the ambient illuminance is lower than the ambient illuminance threshold, luminance corresponding to grayscale 255 of the first display area is adjusted based on a first ambient light adaptation adjustment curve indicating a mapping relationship between the ambient illuminance and the luminance corresponding to the grayscale 255 of the first display area, and luminance corresponding to grayscale 255 of the second display area is adjusted based on a second ambient light adaptation adjustment curve indicating a mapping relationship between the ambient illuminance and the luminance corresponding to the grayscale 255 of the second display area. That is, ambient light adaptation adjustment curves of multiple levels are set to adjust the luminance corresponding to the grayscale 255 of the first display area and the luminance corresponding to the grayscale 255 of the second display area respectively, so that luminance corresponding to the grayscale 255 of the first display area, obtained through adjustment, is controlled to be approximately equal to luminance corresponding to the grayscale 255 of the second display area obtained through adjustment. In this way, the problem of uneven luminance of the first display area and the second display area on the terminal screen can be effectively resolved, and the display effect of the terminal screen can be improved.

Before the display screen adjustment method provided in the embodiment of this application is described in detail, several concepts need to be clarified first. After the several concepts are thoroughly explained, the display screen adjustment method provided in the embodiment of this application is described in detail with reference to embodiments.

Figure 4:
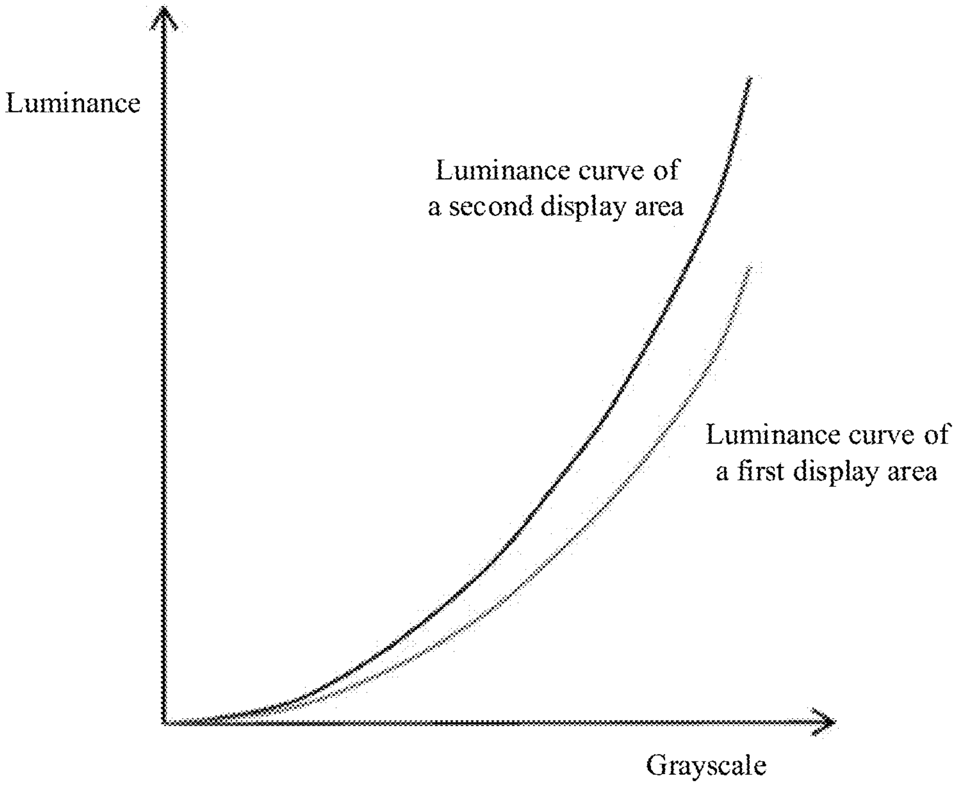
FIG. 4 is a schematic diagram of a relationship between display luminance and grayscale of a display area according to an embodiment of this application.

It may be understood that when the terminal performs screen display, there is an association between display luminance of the terminal and grayscale of a display area. Generally, a larger grayscale of a display area indicates higher display luminance. Take the first display area and the second display area in this application as an example. In same grayscale, the display luminance of the second display area is always higher than the display luminance of the first display area. For example, FIG. 4 is a schematic diagram of a relationship between display luminance and grayscale of a display area according to an embodiment of this application. It can be learned that a maximum grayscale of the display area is 255. It should be noted that, in embodiments of this application, when luminance of a display area needs to be adjusted, luminance corresponding to the grayscale 255 of the display area is emphasized to limit a specification and a capability of a screen panel of the terminal. Luminance of a display area can be adjusted in this manner only for a terminal having a screen panel with such a specification and a capability. The luminance of the display area may be understood as a ratio of an illuminant to a light source area "visible" to human eyes, and is defined as luminance of the light source unit, that is, luminous intensity per unit projection area. Ambient illuminance is ambient illumination intensity, and may be understood as a luminous flux of visible light received per unit area on a surface of a projected subject.

Figure 5:
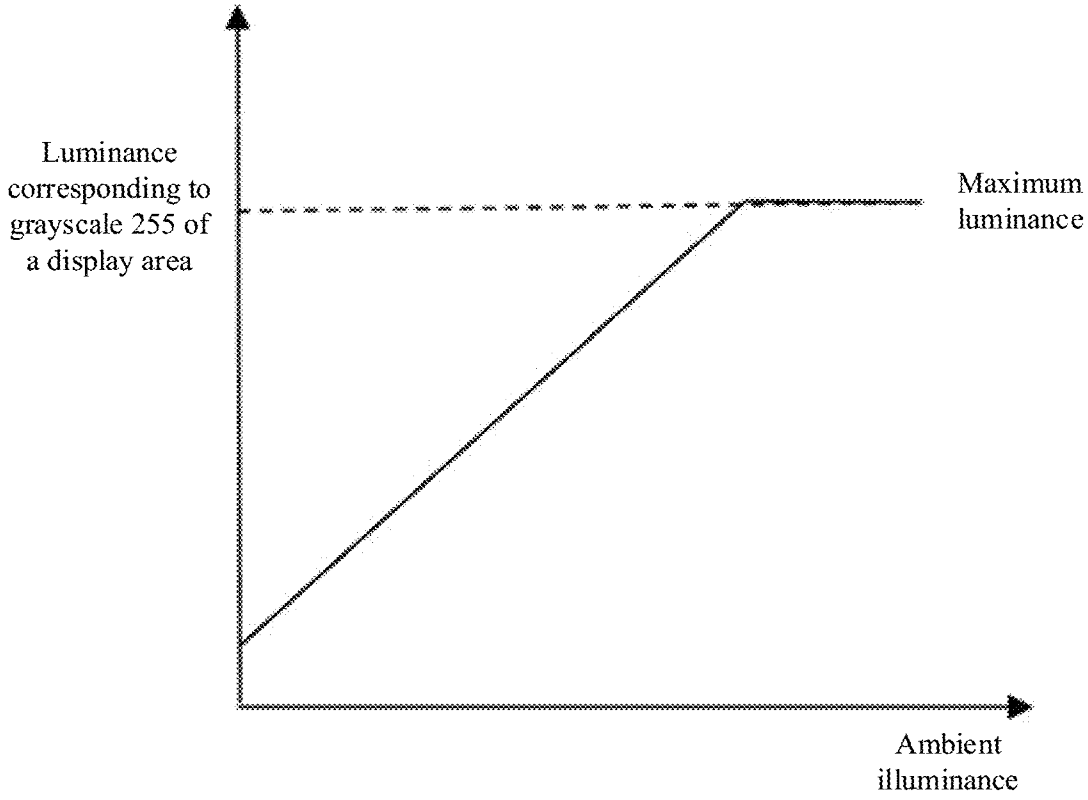
FIG. 5 is a schematic diagram of a relationship between grayscale 255 of a display area and ambient illuminance according to an embodiment of this application.

It can be learned from the foregoing descriptions that the display screen adjustment method provided in an embodiment of the application is limited only to a scenario in which ambient illuminance is lower than an ambient illuminance threshold. In an embodiment, in a low-light scenario in which ambient illuminance is low, because naked eyes are good at sensing screen luminance of different intensities, ambient light adaptation adjustment curves of multiple levels are set to adjust luminance corresponding to grayscale 255 of the first display area and luminance corresponding to grayscale 255 of the second display area respectively, so that luminance corresponding to the grayscale 255 of the first display area obtained through adjustment is approximately equal to luminance corresponding to the grayscale 255 of the second display area obtained through adjustment. It should be noted that, if security of a component in the first display area is not considered, in a scenario in which the ambient illuminance is higher than or equal to the ambient illuminance threshold, that is, in a high-light scenario in which the ambient illuminance is high, the ambient light adaptation adjustment curves of multiple levels are set to adjust the luminance corresponding to the grayscale 255 of the first display area and the luminance corresponding to the grayscale 255 of the second display respectively, so that luminance corresponding to the grayscale 255 of the first display area obtained through adjustment is approximately equal to luminance corresponding to the grayscale 255 of the second display area obtained through adjustment. Usually, when the luminance of the first display area and the luminance of the second display area on the terminal screen need to be adjusted, for any display area on the terminal screen, luminance corresponding to grayscale 255 of the display area increases with increase of ambient illuminance. For a curve indicating a relationship between the luminance corresponding to the grayscale 255 of the display area and the ambient illuminance, refer to FIG. 5. FIG. 5 is a schematic diagram of a relationship between luminance corresponding to grayscale 255 of a display area and ambient illuminance according to an embodiment of this application. It can be learned that the luminance corresponding to the grayscale 255 of the display area increases with the increase of the ambient illuminance, and stops increasing with the increase of the ambient illuminance when the luminance corresponding to the grayscale 255 of the display area reaches maximum luminance corresponding to the grayscale 255 of the display area, and then the luminance corresponding to the grayscale 255 of the display area maintains at the maximum luminance, to prevent a physical capability of the display area from being exceeded due to the luminance increase. This ensures the security of the component in the first display area. In view of the above consideration, if present ambient illuminance on the terminal is high, for example, when the terminal is in a high-light scenario in which ambient illuminance is high, and luminance corresponding to the ambient illuminance is the maximum luminance corresponding to the grayscale 255 of the first display area, given that the naked eyes are weak at sensing screen luminance of different intensities, the following adjustments are made to prevent a physical capability of the terminal from being exceeded, so as to ensure the security of the component in the first display area. When the ambient illuminance is higher than or equal to the ambient illuminance threshold, for the first display area, first luminance of the first display area may be controlled, based on the physical capability of the component in the first display area, to maintain at the maximum luminance corresponding to the grayscale 255 of the first display area, and does not increase with the increase of the ambient illuminance; however, for the second display area, adjustment to second luminance of the second display area may be continued, and the second luminance of the second display area increases with increase of the ambient illuminance until the luminance of the second display area increases to maximum luminance corresponding to the grayscale 255 of the second display area. In addition, in the entire adjustment process, the second luminance of the second display area is always higher than the first luminance of the first display area.

It can be learned from the above descriptions that in an embodiment of the application, when the luminance of the first display area and the luminance of the second display area on the terminal screen need to be adjusted, the ambient light adaptation adjustment curves of multiple levels are set to adjust the luminance corresponding to the grayscale 255 of the first display area and the luminance corresponding to the grayscale 255 of the second display area respectively, so that the luminance corresponding to the grayscale 255 of the first display area obtained through adjustment is controlled to be approximately equal to the luminance corresponding to the grayscale 255 of the second display area obtained through adjustment. As a result, the problem of uneven luminance of the first display area and the second display area on the terminal screen can be resolved. Therefore, a display effect of the terminal screen can be improved. For example, when the luminance corresponding to the grayscale 255 of the first display area and the luminance corresponding to the grayscale 255 of the second display area need to be adjusted based on the ambient light adaptation adjustment curves of multiple levels. There are at least two definitions of the ambient light adaptation adjustment curves of multiple levels. With reference to the at least two different definitions, the display screen adjustment method provided in an embodiment of the application may include at least two different scenarios.

In a scenario, the ambient light adaption adjustment curves of multiple levels may be defined as the curve indicating the relationship between ambient illuminance and luminance corresponding to grayscale 255 of a display area. In an embodiment, a first ambient light adaption adjustment curve is defined as a curve indicating a relationship between the ambient illuminance and the luminance corresponding to the grayscale 255 of the first display area, and a second ambient light adaption adjustment curve is defined as a curve indicating a relationship between the ambient illuminance and the luminance corresponding to the grayscale 255 of the second display area. In this way, after the present ambient illuminance on the terminal is collected, the luminance corresponding to the grayscale 255 of the first display area in the terminal may be adjusted based on the curve indicating the relationship between the ambient illuminance and the luminance corresponding to the grayscale 255 of the first display area, and the luminance corresponding to the grayscale 255 of the second display area in the terminal may be adjusted based on the curve indicating the relationship between the ambient illuminance and the luminance corresponding to the grayscale 255 of the second display area. As a result, the luminance corresponding to the grayscale 255 of the first display area obtained through adjustment is the same as the luminance corresponding to the grayscale 255 of the second display area obtained through adjustment. In this way, the problem of uneven luminance of the first display area and the second display area on the terminal screen can be resolved. Therefore, a display effect of the terminal screen can be improved. It may be understood that, in this scenario, when the ambient illuminance is lower than the ambient illuminance threshold, a slope of the first ambient light adaptation adjustment curve is approximately equal to a slope of the second ambient light adaptation adjustment curve.

In another scenario, the ambient light adaptation adjustment curves of multiple levels may be defined as a ratio curve. In an embodiment, the first ambient light adaptation adjustment curve is defined as a first ratio curve, and the second ambient light adaptation adjustment curve is defined as a second ratio curve, so that after the present ambient illuminance on the terminal is collected, the luminance corresponding to the grayscale 255 of the first display area in the terminal can be adjusted based on the ambient illuminance and the first ratio curve, and the luminance corresponding to the grayscale 255 of the second display area in the terminal can be adjusted based on the ambient illuminance and the second ratio curve. In this manner, the luminance corresponding to the grayscale 255 of the first display area obtained through adjustment can be the same as the luminance corresponding to the grayscale 255 of the second display area obtained through adjustment. In this way, the problem of uneven luminance of the first display area and the second display area on the terminal screen can be resolved. Therefore, a display effect of the terminal screen can be improved.

It may be understood that, in this scenario, when the ambient illuminance is lower than the ambient illuminance threshold, a slope of the first ratio curve is greater than a slope of the second ratio curve. In addition, when the first ratio curve is a curve indicating a relationship between the ambient illuminance and a pulse width modulation ratio corresponding to the grayscale 255 of the first display area, the second ratio curve is a curve indicating a relationship between the ambient illuminance and a pulse width modulation ratio corresponding to the grayscale 255 of the second display area. Alternatively, when the first ratio curve is a curve indicating a relationship between the ambient illuminance and a current ratio corresponding to the grayscale 255 of the first display area, the second ratio curve is a curve indicating a relationship between the ambient illuminance and a current ratio corresponding to the grayscale 255 of the second display area.

With reference to the foregoing two different scenarios, the following describes in detail a technical solution of adjusting the luminance corresponding to the grayscale 255 of the first display area and the luminance corresponding to the grayscale 255 of the second display area in a scenario in which the ambient illuminance is lower than the ambient illuminance threshold, that is, in a low-light scenario, so that the luminance corresponding to the grayscale 255 of the first display area obtained through adjustment is approximately equal to the luminance corresponding to the grayscale 255 of the second display area obtained through adjustment. It may be understood that the following several embodiments may be combined with each other, and a same or similar concept or process may not be described again in some embodiments.

Figure 6:
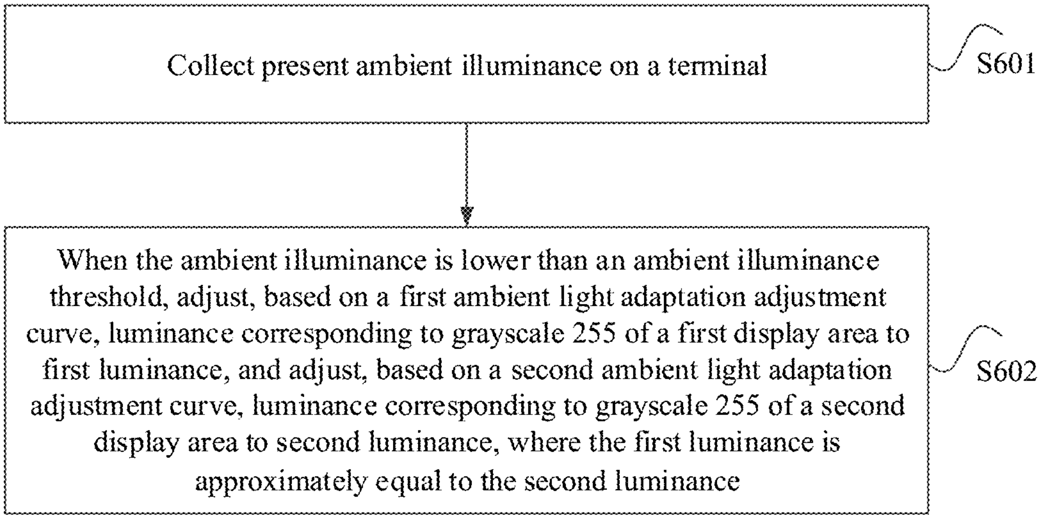
FIG. 6 is a schematic flowchart of a display screen adjustment method according to an embodiment of this application.

In a scenario, the ambient light adaptation adjustment curves of multiple levels are defined as the curve indicating the relationship between ambient illuminance and luminance corresponding to grayscale 255 of a display area. For example, FIG. 6 is a schematic flowchart of a display screen adjustment method according to an embodiment of this application. The display screen adjustment method may include the following operations.

S601. Collect present ambient illuminance on a terminal.

For example, when the present ambient illuminance on the terminal is collected, the ambient illuminance may be collected by an ambient light sensor disposed inside the terminal, or the present ambient illuminance on the terminal may be collected by an external device, and the ambient illuminance collected by the external device is obtained through the external device. This may be set based on an actual requirement. How to collect the present ambient illuminance on the terminal is not limited in an embodiment of the application. Usually, the ambient illuminance is collected by the ambient light sensor disposed inside the terminal.

After the present ambient illuminance on the terminal is collected, the collected present ambient illuminance may be compared with an ambient illuminance threshold, so that a corresponding luminance adjustment policy can be determined based on a comparison result. If the collected present ambient illuminance is higher than or equal to the ambient illuminance threshold, a corresponding illuminance adjustment policy is as follows. First luminance of a first display area on a terminal screen is controlled to maintain at maximum luminance corresponding to grayscale 255 of the first display area, and not to increase with increase of the ambient illuminance; and for a second display area, adjustment to second luminance of the second display area may be continued, and the second luminance of the second display area increases with the increase of the ambient illuminance until the luminance of the second display area increases to maximum luminance corresponding to grayscale 255 of the second display area. On the contrary, if the collected present ambient illuminance is lower than the ambient illuminance threshold, a corresponding illuminance adjustment policy is as follows. The luminance corresponding to the grayscale 255 of the first display area is adjusted to the first luminance based on a curve indicating a relationship between the ambient illuminance and the luminance corresponding to the grayscale 255 of the first display area, and the luminance corresponding to the grayscale 255 of the second display area is adjusted to the second luminance based on a curve indicating a relationship between the ambient illuminance and the luminance corresponding to the grayscale 255 of the second display area, where the first luminance is approximately equal to the second luminance. Based on the foregoing descriptions, it can be learned that the following embodiments in this application mainly describe in detail a technical solution of adjusting the luminance corresponding to the grayscale 255 of the first display area and the luminance corresponding to the grayscale 255 of the second display area in a scenario in which the ambient illuminance is lower than the ambient illuminance threshold, that is, in a low-light scenario, so that the luminance corresponding to the grayscale 255 of the first display area obtained through adjustment is approximately equal to the luminance corresponding to the grayscale 255 of the second display area obtained through adjustment. For details, refer to S602.

S602. When the ambient illuminance is lower than the ambient illuminance threshold, adjust, based on a first ambient light adaptation adjustment curve, the luminance corresponding to the grayscale 255 of the first display area to the first luminance, and adjust, based on a second ambient light adaptation adjustment curve, the luminance corresponding to the grayscale 255 of the second display area to the second luminance, where the first luminance is approximately equal to the second luminance.

The first ambient light adaptation adjustment curve is the curve indicating the relationship between the ambient illuminance and the luminance corresponding to the grayscale 255 of the first display area, the second ambient light adaptation adjustment curve is the curve indicating the relationship between the ambient illuminance and the luminance corresponding to the grayscale 255 of the second display area, and a slope of the first ambient light adaptation adjustment curve is approximately equal to a slope of the second ambient light adaptation adjustment curve.

For example, in a process of determining the ambient illuminance threshold, because a physical capability of a component in the first display area cannot be exceeded, maximum luminance of the first display area is the maximum luminance corresponding to the grayscale 255 of the first display area. Therefore, ambient illuminance that is on the second ambient light adaptation curve and that corresponds to illuminance equal to the maximum luminance corresponding to the grayscale 255 of the first display area may be determined as the ambient illuminance threshold.

Figure 7:
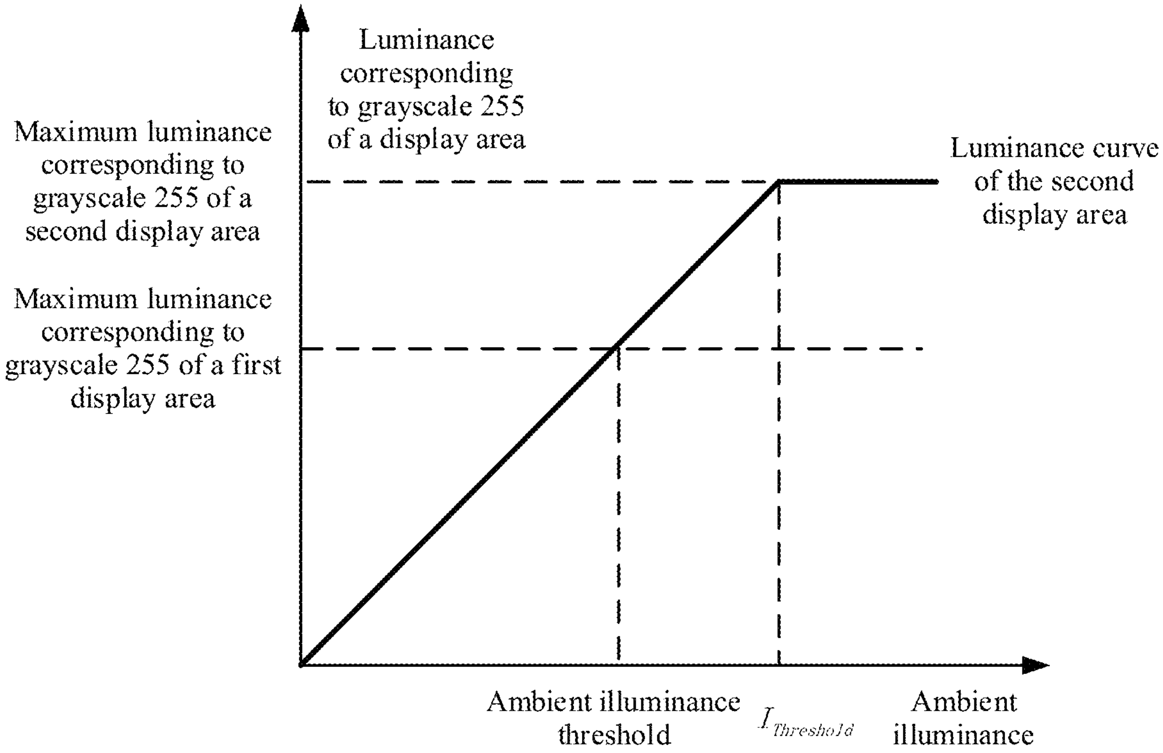
FIG. 7 is a schematic diagram of a second ambient light adaptation adjustment curve according to an embodiment of this application.

After it is determined that the ambient illuminance is lower than the ambient illuminance threshold, the luminance corresponding to the grayscale 255 of the first display area may be adjusted based on the first ambient light adaptation adjustment curve, and the luminance corresponding to the grayscale 255 of the second display area is adjusted based on the second ambient light adaptation adjustment curve. It can be easily understood that the first ambient light adaptation adjustment curve and the second ambient light adaptation adjustment curve need to be obtained before the luminance corresponding to the grayscale 255 of the first display area is adjusted based on the first ambient light adaptation adjustment curve and the luminance corresponding to the grayscale 255 of the second display area is adjusted based on the second ambient light adaptation adjustment curve. For example, in a process of obtaining the first ambient light adaptation adjustment curve and the second ambient light adaptation adjustment curve, because the maximum luminance corresponding to the grayscale 255 of the first display area is lower than the maximum luminance corresponding to the grayscale 255 of the second display area, to some extent, the second ambient light adaptation adjustment curve corresponding to the second display area cannot be obtained based on the first ambient light adaptation adjustment curve corresponding to the first display area. Therefore, the second ambient light adaptation adjustment curve corresponding to the second display area whose luminance is higher may be first obtained. In a process of obtaining the second ambient light adaptation adjustment curve corresponding to the second display area whose luminance is higher, because the second ambient light adaptation adjustment curve is the curve indicating the relationship between the ambient illuminance and the luminance corresponding to the grayscale 255 of the second display area, at least two groups that are of the second display area and that are consisted of ambient illuminance and luminance corresponding to the ambient illuminance may be obtained, and the second ambient light adaptation adjustment curve is established based on the at least two groups consisted of ambient illuminance and luminance corresponding to the ambient illuminance. In this way, the second ambient light adaptation adjustment curve is obtained. It may be understood that, during establishment of the second ambient light adaptation adjustment curve, when a larger quantity of groups are used, a larger quantity of second ambient light adaptation adjustment curves can be established. Usually, the second ambient light adaptation adjustment curve is a monotonic curve, and may be described from a perspective of slope. In an ideal condition, for the second ambient light adaptation adjustment curve, when the ambient illuminance is lower than the ambient illuminance threshold, the relationship between the ambient illuminance and the luminance corresponding to the grayscale 255 of the second display area may be represented by a straight-line segment. For example, FIG. 7 is a schematic diagram of the second ambient light adaption adjustment curve according to an embodiment of this application. With reference to FIG. 7, it can be learned that when the ambient illuminance is lower than the ambient illuminance threshold, the luminance corresponding to the grayscale 255 of the second display area increases with increase of the ambient illuminance. In addition, because the maximum luminance corresponding to the grayscale 255 of the second display area is higher than luminance corresponding to the ambient illuminance threshold, when the ambient illuminance is higher than the ambient illuminance threshold, the luminance corresponding to the grayscale 255 of the second display area still increases with the increase of the ambient illuminance. When the luminance corresponding to the grayscale 255 of the second display area reaches the maximum luminance corresponding to the grayscale 255 of the second display area, the luminance corresponding to the grayscale 255 of the second display area maintains at the maximum luminance corresponding to the grayscale 255 of the second display area, and does not increase with the increase of the ambient illuminance. An adjustment function corresponding to the curve of the second display area may be expressed as Formula 1.

$$B_2 = \begin{cases} B_{MAX2}, & I \geq I_{Threshold} \\ f(I), & I < I_{Threshold} \end{cases} \quad \text{(Formula 1)}$$

$B_2$ represents the luminance corresponding to the grayscale 255 of the second display area under the present ambient illuminance, $B_{MAX2}$ represents the maximum luminance corresponding to the grayscale 255 of the second display area, I represents the present ambient illuminance, and $I_{Threshold}$ represents corresponding ambient illuminance reached when the luminance of the grayscale 255 of the second display area reaches the maximum luminance. In FIG. 7, f (I) represents a luminance adjustment function corresponding to the grayscale 255 of the second display area used when the ambient illuminance is lower than $I_{Threshold}$.

After the second ambient light adaption adjustment curve is obtained, conversion may be performed on the second ambient light adaption adjustment curve to obtain a second ratio curve corresponding to the second ambient light adaption adjustment curve, where the second ratio curve is a curve indicating a relationship between ambient illuminance and a pulse width modulation ratio corresponding to the grayscale 255 of the second display area, or a curve indicating a relationship between ambient illuminance and a current ratio corresponding to the grayscale 255 of the second display area; then a first ratio curve is obtained based on the ambient illuminance threshold, the maximum luminance corresponding to the grayscale 255 of the first display area, and a second ratio curve; and a first ambient light adaption adjustment curve is obtained based on the first ratio curve. Because the maximum luminance corresponding to the grayscale 255 of the second display area is higher than the maximum luminance corresponding to the grayscale 255 of the first display area, correspondingly, a slope of the second ratio curve corresponding to the second ambient light adaptation adjustment curve is smaller than a slope of the first ratio curve corresponding to the second ambient light adaptation adjustment curve. In addition, in an embodiment of the application, when the second ratio curve is a curve indicating the relationship between the ambient illuminance and the pulse width modulation ratio corresponding to the grayscale 255 of the second display area, the first ratio curve is a curve indicating a relationship between the ambient illuminance and a pulse width modulation ratio corresponding to the grayscale 255 of the first display area. Alternatively, when the second ratio curve is a curve indicating a relationship between the ambient illuminance and a current ratio corresponding to the grayscale 255 of the second display area, the first ratio curve is a curve indicating a relationship between the ambient illuminance and a current ratio corresponding to the grayscale 255 of the first display area.

Figure 8:
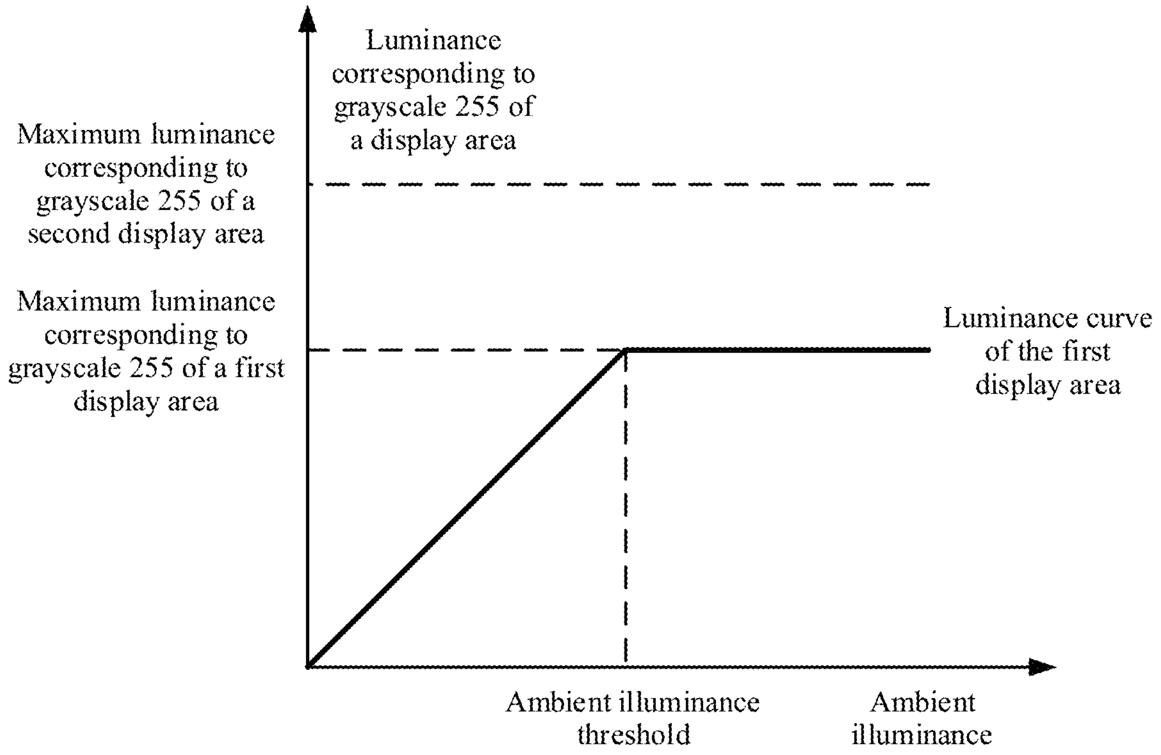
FIG. 8 is a schematic diagram of a first ambient light adaptation adjustment curve according to an embodiment of this application.

Usually, the first ambient light adaptation adjustment curve is also a monotonic curve, and may be described from the perspective of slope. In an ideal condition, for the first ambient light adaptation adjustment curve, when the ambient illuminance is lower than the ambient illuminance threshold, the relationship between the ambient illuminance and the luminance corresponding to the grayscale 255 of the first display area may be represented by a straight-line segment, and the slope of the first ambient light adaptation adjustment curve is approximately equal to the slope of the second ambient light adaptation adjustment curve. For example, FIG. 8 is a schematic diagram of the first ambient light adaption adjustment curve according to an embodiment of this application. With reference to FIG. 8, it can be learned that when the ambient illuminance is lower than the ambient illuminance threshold, the luminance corresponding to the grayscale 255 of the first display area increases with the increase of the ambient illuminance. In addition, because the luminance corresponding to the ambient illuminance threshold is the luminance corresponding to the grayscale 255 of the first display area, when the ambient illuminance is higher than the ambient illuminance threshold, the luminance corresponding to the grayscale 255 of the second display area maintains at the maximum luminance corresponding to the grayscale 255 of the first display area, and does not increase with the increase of the ambient illuminance. An adjustment function corresponding to the curve of the first display area may be expressed as Formula 2.

$$B_1 = \begin{cases} B_{MAX1}, & I \geq I_{up-limit} \\ f(I), & I < I_{up-limit} \end{cases} \quad \text{(Formula 2)}$$

$B_1$ represents the luminance corresponding to the grayscale 255 of the first display area under the present ambient illuminance, $B_{MAX1}$ represents the maximum luminance corresponding to the grayscale 255 of the first display area, I represents the present ambient illuminance, and $I_{up-limit}$ represents the ambient illuminance threshold. In FIG. 7, f (I) represents a luminance adjustment function corresponding to the grayscale 255 of the first display area used when the ambient illuminance is lower than the ambient illuminance threshold $I_{up-limit}$.

It should be noted that, in an embodiment of the application, the ratio curve is defined as a curve indicating a relationship between ambient illuminance and a pulse width modulation ratio corresponding to grayscale 255 of a display area, or as a curve indicating a relationship between ambient illuminance and a current ratio corresponding to grayscale 255 of a display area, and the curve indicating the relationship between the ambient illuminance and the luminance corresponding to the grayscale 255 of the first display area is determined based on the ratio curve. The reason why the foregoing method is applied is as follows. Generally, there are two ways to adjust luminance of a display area. One method is to change a current input into a light emitting diode (LED). Usually, a continuous operating current of an LED is around 20 mA. Except for red LEDs on which saturation may occur, grayscale of other LEDs is basically proportional to a current flowing through. Therefore, the luminance of a display area can be adjusted based on a ratio of a current input into an LED. The other method is to change a pulse width modulation ratio of an input. Due to visual inertia of human eyes, the luminance of a display area can be adjusted by periodically changing a pulse width modulation ratio (that is, a duty ratio) of an input. In a process of luminance adjustment, when a cycle of repeatedly lighting is short enough, human eyes cannot feel vibration of luminous pixels.

After the second ambient light adaptation adjustment curve corresponding to the second display area and the first ambient light adaptation adjustment curve corresponding to the first display area are obtained, it may be learned with reference to the second ambient light adaptation adjustment curve shown in FIG. 6 and the first ambient light adaptation adjustment curve shown in FIG. 7 that when the ambient illuminance is lower than the ambient illuminance threshold, the slope of the second ambient light adaptation adjustment curve is the same as the slope of the first ambient light adaptation adjustment curve. In this case, when the luminance corresponding to the grayscale 255 of the second display area and the luminance corresponding to the grayscale 255 of the first display area are adjusted based on the second ambient light adaptation adjustment curve and the first ambient light adaptation adjustment curve respectively, second luminance corresponding to the grayscale 255 of the second display area obtained through adjustment is the same as first luminance corresponding to the grayscale 255 of the first display area obtained through adjustment. This avoids a poor display effect of the terminal screen caused by uneven luminance of the first display area and the second display area on the terminal screen, and therefore improving a display effect of the terminal screen.

It can be learned that according to the display screen adjustment method provided in an embodiment of the application, when the luminance of the first display area and the luminance of the second display area on the terminal screen need to be adjusted, the present ambient illuminance on the terminal may be first collected, and then compared with the ambient illuminance threshold. When the ambient illuminance is lower than the ambient illuminance threshold, the luminance corresponding to the grayscale 255 of the first display area is adjusted based on the first ambient light adaptation adjustment curve, and the luminance corresponding to the grayscale 255 of the second display area is adjusted based on the second ambient light adaptation adjustment curve. That is, ambient light adaptation adjustment curves of multiple levels are set to adjust the luminance corresponding to the grayscale 255 of the first display area and the luminance corresponding to the grayscale 255 of the second display area respectively, so that the luminance corresponding to the grayscale 255 of the first display area obtained through adjustment is controlled to be approximately equal to the luminance corresponding to the grayscale 255 of the second display area obtained through adjustment. In this way, the problem of uneven luminance of the first display area and the second display area on the terminal screen can be effectively resolved, and a display effect of the terminal screen can be improved.

Figure 9:
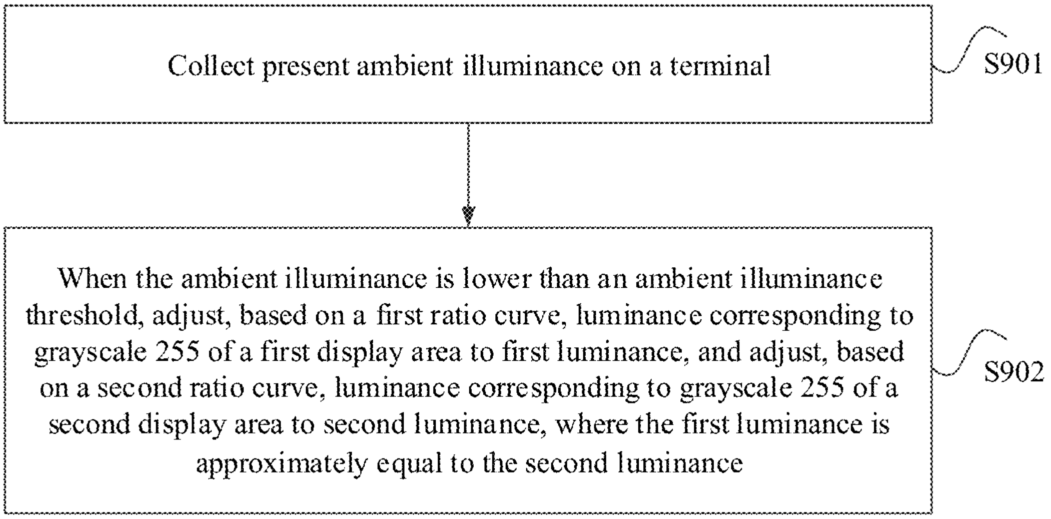
FIG. 9 is a schematic flowchart of another display screen adjustment method according to an embodiment of this application.

The embodiment shown in FIG. 6 describes in detail the technical solution, applied to a scenario, of respectively adjusting the luminance corresponding to the grayscale 255 of the first display area and the luminance corresponding to the grayscale 255 of the second display area when the ambient light adaptation adjustment curves of multiple levels are defined as the curve indicating the relationship between ambient illuminance and luminance corresponding to grayscale 255 of a display area, so that the luminance corresponding to the grayscale 255 of the first display area obtained through adjustment is approximately equal to the luminance corresponding to the grayscale 255 of the second display area obtained through adjustment. The following describes in detail a technical solution, applied to another scenario, of respectively adjusting the luminance corresponding to the grayscale 255 of the first display area and the luminance corresponding to the grayscale 255 of the second display area when the ambient light adaptation adjustment curves of multiple levels are defined as the ratio curve, so that the luminance corresponding to the grayscale 255 of the first display area obtained through adjustment is approximately equal to the luminance corresponding to the grayscale 255 of the second display area obtained through adjustment. For example, FIG. 9 is a schematic flowchart of another display screen adjustment method according to an embodiment of this application. The display screen adjustment method may include the following operations.

S901. Collect present ambient illuminance on a terminal.

For example, when the present ambient illuminance on a terminal is collected, the ambient illuminance may be collected by an ambient light sensor disposed inside the terminal, or the present ambient illuminance on the terminal may be collected by an external device, and the ambient illuminance collected by the external device is obtained through the external device. This may be set based on an actual requirement. How to collect the present ambient illuminance on the terminal is not limited in an embodiment of the application. Usually, the ambient illuminance is collected by the ambient light sensor disposed inside the terminal.

After the present ambient illuminance on the terminal is collected, the collected present ambient illuminance may be compared with an ambient illuminance threshold, so that a corresponding luminance adjustment policy can be determined based on a comparison result. If the collected present ambient illuminance is higher than or equal to the ambient illuminance threshold, a corresponding illuminance adjustment policy is as follows. First luminance of a first display area on a terminal screen is controlled to maintain at maximum luminance corresponding to grayscale 255 of the first display area, and not to increase with increase of the ambient illuminance; and for a second display area, adjustment to second luminance of the second display area may be continued, and the second luminance of the second display area increases with the increase of the ambient illuminance until the luminance of the second display area increases to maximum luminance corresponding to grayscale 255 of the second display area. On the contrary, if the collected present ambient illuminance is lower than the ambient illuminance threshold, a corresponding illuminance adjustment policy is as follows. The luminance corresponding to the grayscale 255 of the first display area is adjusted to the first luminance based on a curve indicating a relationship between the ambient illuminance and the luminance corresponding to the grayscale 255 of the first display area, and the luminance corresponding to the grayscale 255 of the second display area is adjusted to the second luminance based on a curve indicating a relationship between the ambient illuminance and the luminance corresponding to the grayscale 255 of the second display area, where the first luminance is approximately equal to the second luminance. Based on the foregoing descriptions, it can be learned that the following embodiments in this application mainly describe in detail a technical solution of adjusting the luminance corresponding to the grayscale 255 of the first display area and the luminance corresponding to the grayscale 255 of the second display area in a scenario in which the ambient illuminance is lower than the ambient illuminance threshold, that is, in a low-light scenario, so that the luminance corresponding to the grayscale 255 of the first display area obtained through adjustment is approximately equal to the luminance corresponding to the grayscale 255 of the second display area obtained through adjustment. For details, refer to S902.

S902. When the ambient illuminance is lower than the ambient illuminance threshold, adjust, based on a first ratio curve, the luminance corresponding to the grayscale 255 of the first display area to the first luminance, and adjust, based on a second ratio curve, the luminance corresponding to the grayscale 255 of the second display area to the second luminance, where the first luminance is approximately equal to the second luminance.

A slope of the first ratio curve is greater than a slope of the second ratio curve. When the second ratio curve is a curve indicating the relationship between the ambient illuminance and a pulse width modulation ratio corresponding to the grayscale 255 of the second display area, the first ratio curve is a curve indicating a relationship between the ambient illuminance and a pulse width modulation ratio corresponding to the grayscale 255 of the first display area. Alternatively, when the second ratio curve is a curve indicating a relationship between the ambient illuminance and a current ratio corresponding to the grayscale 255 of the second display area, the first ratio curve is a curve indicating a relationship between the ambient illuminance and a current ratio corresponding to the grayscale 255 of the first display area. It should be noted that, in an embodiment of the application, the ratio curve is defined as a curve indicating a relationship between ambient illuminance and a pulse width modulation ratio corresponding to grayscale 255 of a display area, or as a curve indicating a relationship between ambient illuminance and a current ratio corresponding to grayscale 255 of a display area, and the curve indicating the relationship between the ambient illuminance and the luminance corresponding to the grayscale 255 of the first display area is determined based on the ratio curve. The reason why the foregoing method is applied is as follows. Generally, there are two methods to adjust luminance of a display area. One method is to change a current input into a light emitting diode (LED). Usually, a continuous operating current of an LED is around 20 mA. Except for red LEDs on which saturation may occur, grayscale of other LEDs is basically proportional to a current flowing through. Therefore, the luminance of a display area can be adjusted based on a ratio of a current input into an LED. The other method is to change a pulse width modulation ratio of an input. Due to visual inertia of human eyes, the luminance of a display area can be adjusted by periodically changing a pulse width modulation ratio (that is, a duty ratio) of an input. In a process of luminance adjustment, when a cycle of repeatedly lighting is short enough, human eyes cannot feel vibration of luminous pixels.

For example, in a process of determining the ambient illuminance threshold, because a physical capability of a component in the first display area cannot be exceeded, when the ratio curve is the curve indicating the relationship between ambient illuminance and a pulse width modulation ratio corresponding to grayscale 255 of a display area, a maximum pulse width modulation ratio of the first display area can only be adjusted to a maximum pulse width modulation ratio corresponding to the grayscale 255 of the first display area. In other words, the ambient illuminance threshold is ambient illuminance that is on the second ratio curve and that corresponds to a pulse width modulation ratio equal to the maximum pulse width modulation ratio corresponding to the grayscale 255 of the first display area. Alternatively, when the ratio curve is the curve indicating the relationship between ambient illuminance and a current ratio corresponding to grayscale 255 of a display area, a maximum current ratio of the first display area can only be adjusted to a maximum current ratio corresponding to the grayscale 255 of the first display area. In other words, the ambient illuminance threshold is ambient illuminance that is on the second ratio curve and that corresponds to a current ratio equal to the maximum current ratio corresponding to the grayscale 255 of the first display area.

After it is determined that the ambient illuminance is lower than the ambient illuminance threshold, the luminance corresponding to the grayscale 255 of the first display area may be adjusted based on the first ratio curve, and the luminance corresponding to the grayscale 255 of the second display area is adjusted based on the second ratio curve. It can be easily understood that the first ratio curve and the second ratio curve need to be obtained before the luminance corresponding to the grayscale 255 of the first display area is adjusted based on the first ratio curve and the luminance corresponding to the grayscale 255 of the second display area is adjusted based on the second ratio curve. For example, in a process of obtaining the first ratio curve and the second ratio curve, because the maximum luminance corresponding to the grayscale 255 of the first display area is lower than the maximum luminance corresponding to the grayscale 255 of the second display area, to some extent, the second ratio curve corresponding to the second display area cannot be obtained based on the first ratio curve corresponding to the first display area. Therefore, the second ratio curve corresponding to the second display area whose luminance is higher may be first obtained. For example, in a process of obtaining the second ratio curve corresponding to the second display area whose luminance is higher, at least two groups consisted of ambient illuminance and luminance corresponding to the ambient illuminance, of the second display area, may be obtained first; a curve indicating a relationship between the ambient illuminance and the luminance corresponding to the grayscale 255 of the second display area is established based on the at least two groups consisted of ambient illuminance and luminance corresponding to the ambient illuminance; and then conversion is performed on the curve indicating the relationship between the ambient illuminance and the luminance corresponding to the grayscale 255 of the second display area, to obtain the second ratio curve corresponding to the second display area. For the second ratio curve, refer to FIG. 7. It should be noted that, in an embodiment of the application, the method for obtaining the curve indicating the relationship between the ambient illuminance and the luminance corresponding to the grayscale 255 of the second display area is the same as the method for obtaining the curve indicating the relationship between the ambient illuminance and the luminance corresponding to the grayscale 255 of the second display area in the embodiment shown in FIG. 6. For details, refer to related descriptions of the method for obtaining the curve indicating the relationship between the ambient illuminance and the luminance corresponding to the grayscale 255 of the second display area in the embodiment shown in FIG. 6. The details are not described in an embodiment of the application again.

Figure 10:
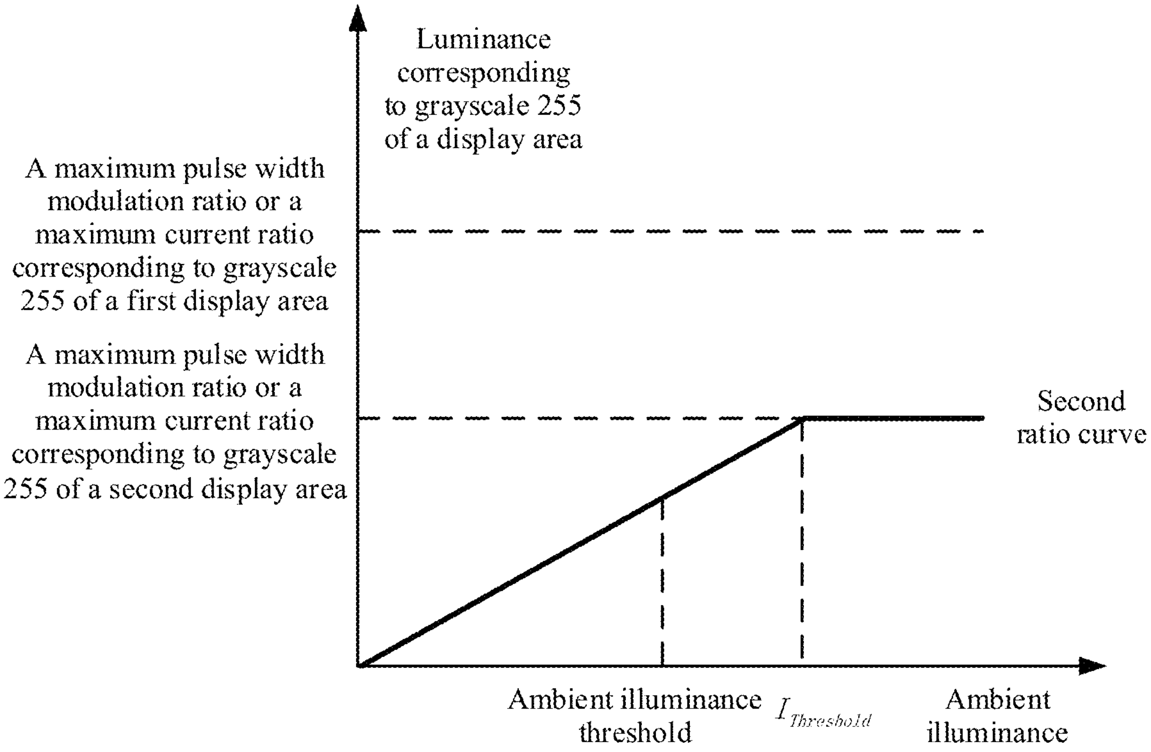
FIG. 10 is a schematic diagram of a second ratio curve corresponding to a second display area according to an embodiment of this application.
Figure 11:
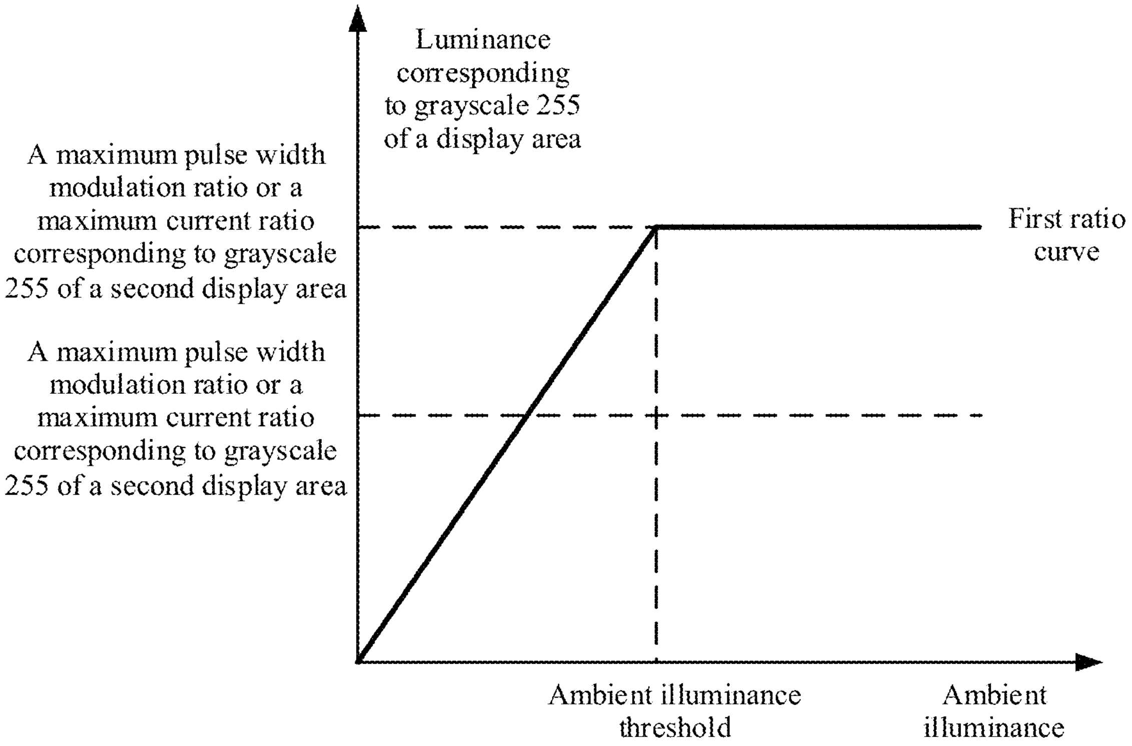
FIG. 11 is a schematic diagram of a first ratio curve corresponding to a first display area according to an embodiment of this application.

After the curve indicating the relationship between the ambient illuminance and the luminance corresponding to the grayscale 255 of the second display area is obtained, conversion may be performed on the curve indicating the relationship between the ambient illuminance and the luminance corresponding to the grayscale 255 of the second display area, to obtain the second ratio curve corresponding to the second display area, and then the first ratio curve is obtained based on the ambient illuminance threshold, the maximum luminance corresponding to the grayscale 255 of the first display area, and the second ratio curve. It may be understood that, in an embodiment of the application, because the maximum luminance corresponding to the grayscale 255 of the second display area is higher than the maximum luminance corresponding to the grayscale 255 of the first display area, the slope of the second ratio curve corresponding to the second display area needs to be smaller than the slope of the first ratio curve corresponding to the first display area, so that second luminance corresponding to the grayscale 255 of the second display area obtained through adjustment is controlled to be approximately equal to second luminance corresponding to the grayscale 255 of the first display area obtained through adjustment after the luminance corresponding to the grayscale 255 of the second display area and the luminance corresponding to the grayscale 255 of the first display area are adjusted based on the second ratio curve and the first ratio curve respectively. In this way, it can be ensured that the second luminance corresponding to the grayscale 255 of the second display area obtained through adjustment is approximately equal to the second luminance corresponding to the grayscale 255 of the first display area obtained through adjustment. Generally, both the first ratio curve and the second ratio curve are curves. In an ideal condition, on the first ratio curve and the second ratio curve, when the ambient illuminance is lower than the ambient illuminance threshold, the first ratio curve and the second ratio curve may be represented by straight-line segments. For example, the maximum luminance corresponding to the grayscale 255 of the first display area is 300, and the maximum luminance corresponding to the grayscale 255 of the second display area is 600. It can be learned that the maximum luminance 600 corresponding to the grayscale 255 of the second display area is twice the maximum luminance 300 corresponding to the grayscale 255 of the first display area. To control the second luminance corresponding to the grayscale 255 of the second display area obtained through adjustment to be approximately equal to the second luminance corresponding to the grayscale 255 of the first display area obtained through adjustment, the slope of the first ratio curve corresponding to the second display area may be half the slope of the first ratio curve corresponding to the first display area. Refer to FIG. 10 and FIG. 11. For example, FIG. 10 is a schematic diagram of the second ratio curve corresponding to the second display area according to an embodiment of this application, and FIG. 11 is a schematic diagram of the first ratio curve corresponding to the first display area according to an embodiment of this application. It can be learned from FIG. 10 that, when the ambient illuminance is lower than the ambient illuminance threshold, the pulse width modulation ratio or the current ratio corresponding to the grayscale 255 of the second display area increases with the increase of the ambient illuminance. In addition, for example, the second ratio curve is a curve indicating the relationship between the ambient illuminance and the pulse width modulation ratio corresponding to the grayscale 255 of the second display area. Because the maximum pulse width modulation ratio corresponding to the grayscale 255 of the second display area is higher than a pulse width modulation ratio corresponding to the ambient illuminance threshold, when the ambient illuminance is higher than the ambient illuminance threshold, the pulse width modulation ratio corresponding to the grayscale 255 of the second display area still increases with the increase of the ambient illuminance. When the pulse width modulation ratio corresponding to the grayscale 255 of the second display area reaches the maximum pulse width modulation ratio corresponding to the grayscale 255 of the second display area, the pulse width modulation ratio corresponding to the grayscale 255 of the second display area maintains at the maximum pulse width modulation ratio corresponding to the grayscale 255 of the second display area, and does not increase with the increase of the ambient illuminance. An adjustment function corresponding to the second ratio curve may be expressed as Formula 3.

$$C_2 = \begin{cases} B_{MAX2}, & I \geq I_{Threshold} \\ G(I), & I < I_{Threshold} \end{cases} \quad \text{(Formula 3)}$$

$C_2$ represents the pulse width modulation ratio corresponding to the grayscale 255 of the second display area under the present ambient illuminance, $C_{MAX2}$ represents the maximum pulse width modulation ratio corresponding to the grayscale 255 of the second display area, I represents the present ambient illuminance, and $I_{Threshold}$ represents corresponding ambient illuminance reached when the pulse width modulation ratio corresponding to the grayscale 255 of the second display area reaches the maximum pulse width modulation ratio. In FIG. 10, C represents a pulse width modulation ratio adjustment function corresponding to the grayscale 255 of the second display area used when the ambient illuminance is lower than $I_{Threshold}$.

It can be learned from FIG. 11 that, when the ambient illuminance is lower than the ambient illuminance threshold, the pulse width modulation ratio or the current ratio corresponding to the grayscale 255 of the first display area increases with the increase of the ambient illuminance. Similarly, for example, the first ratio curve is a curve indicating the relationship between the ambient illuminance and the pulse width modulation ratio corresponding to the grayscale 255 of the first display area. Because the pulse width modulation ratio corresponding to the ambient illuminance threshold is the maximum pulse width modulation ratio corresponding to the grayscale 255 of the first display area, when the ambient illuminance is higher than the ambient illuminance threshold, the pulse width modulation ratio corresponding to the grayscale 255 of the second display area maintains at the maximum pulse width modulation ratio corresponding to the grayscale 255 of the first display area, and does not increase with the increase of the ambient illuminance. An adjustment function corresponding to the first ratio curve may be expressed as Formula 4.

$$C_1 = \begin{cases} C_{MAX2}, & I \geq I_{up\text{-}limit} \\ G(I), & I < I_{up\text{-}limit} \end{cases} \quad \text{(Formula 4)}$$

$C_1$ represents the pulse width modulation ratio corresponding to the grayscale 255 of the first display area under the present ambient illuminance, $C_{MAX1}$ represents the maximum pulse width modulation ratio corresponding to the grayscale 255 of the first display area, I represents the present ambient illuminance, and $I_{up\text{-}limit}$ represents the ambient illuminance threshold. In FIG. 10, G (I) represents a pulse width modulation ratio adjustment function corresponding to the grayscale 255 of the first display area used when the ambient illuminance is lower than the ambient illuminance threshold $I_{up\text{-}limit}$.

It may be understood that an embodiment of the application is described by using an example in which the second ratio curve is the curve indicating the relationship between the ambient illuminance and the pulse width modulation ratio corresponding to the grayscale 255 of the second display area. When the second ratio curve is a curve indicating the relationship between the ambient illuminance and the current ratio corresponding to the grayscale 255 of the second display area, a ratio curve and an adjustment function that correspond to the second ratio curve are similar to those corresponding to the second ratio curve when the second ratio curve is the curve indicating the relationship between the ambient illuminance and the pulse width modulation ratio corresponding to the grayscale 255 of the second display area. Details are not described herein again in embodiments of this application.

It should be noted that, after the first ratio curve and the second ratio curve are obtained, for how to adjust, based on the first ratio curve, the luminance corresponding to the grayscale 255 of the first display area and how to adjust, based on the second ratio curve, the luminance corresponding to the grayscale 255 of the second display area, refer to related descriptions of adjusting, based on a ratio curve, luminance corresponding to grayscale 255 of a display area in the existing technology. Details are not described in embodiments of this application.

After the second ratio curve corresponding to the second display area and the first ratio curve corresponding to the first display area are obtained, it may be learned from the second ratio curve shown in FIG. 10 and the first ratio curve shown in FIG. 11 that when the ambient illuminance is lower than the ambient illuminance threshold, although the slope of the second ratio curve is smaller than the slope of the first ratio curve, the maximum luminance corresponding to the second display area is higher than the maximum luminance corresponding to the first display area. In this case, when the luminance corresponding to the grayscale 255 of the second display area and the luminance corresponding to the grayscale 255 of the first display area are adjusted based on the first ratio curve and the second ratio curve respectively, second luminance corresponding to the grayscale 255 of the second display area obtained through adjustment is the same as first luminance corresponding to the grayscale 255 of the first display area obtained through adjustment. This also avoids a poor display effect of the terminal screen caused by uneven luminance of the first display area and the second display area on the terminal screen, and therefore improving a display effect of the terminal screen.

It can be learned that according to the display screen adjustment method provided in embodiments of this application, when the luminance of the first display area and the luminance of the second display area on the terminal screen need to be adjusted, the present ambient illuminance on the terminal may be first collected, and then compared with the ambient illuminance threshold. When the ambient illuminance is lower than the ambient illuminance threshold, the luminance corresponding to the grayscale 255 of the first display area may be adjusted based on the first ratio curve, and the luminance corresponding to the grayscale 255 of the second display area is adjusted based on the second ratio curve. That is, ratio curves of multiple levels are set to adjust the luminance corresponding to the grayscale 255 of the first display area and the luminance corresponding to the grayscale 255 of the second display area respectively, so that the luminance corresponding to the grayscale 255 of the first display area obtained through adjustment is controlled to be approximately equal to the luminance corresponding to the grayscale 255 of the second display area obtained through adjustment. In this way, the problem of uneven luminance of the first display area and the second display area on the terminal screen can be effectively resolved, and the display effect of the terminal screen can be improved.

The embodiment shown in FIG. 6 or FIG. 9 describes in detail a technical solution of respectively adjusting, based on the first ambient light adaptation adjustment curve and the second ambient light adaptation adjustment curve, the luminance corresponding to the grayscale 255 of the first display area and the luminance corresponding to the grayscale 255 of the second display area when the ambient illuminance is lower than the ambient illuminance threshold, so that the luminance corresponding to the grayscale 255 of the first display area obtained through adjustment is approximately equal to the luminance corresponding to the grayscale 255 of the second display area obtained through adjustment. It can be learned that in the foregoing solution, when the luminance corresponding to the grayscale 255 of the first display area and the luminance corresponding to the grayscale 255 of the second display area are adjusted, only the present ambient illuminance is considered, but another influencing factor that affects the luminance of the area is not considered, for example, at least one influencing factor in a present operation interface of the terminal or a present working mode of the terminal. The foregoing influencing factors are respectively considered in the following descriptions. The following describes in detail a technical solution of respectively adjusting, based on the first ambient light adaptation adjustment curve and the second ambient light adaptation adjustment curve, the luminance corresponding to the grayscale 255 of the first display area and the luminance corresponding to the grayscale 255 of the second display area when the ambient illuminance is lower than the ambient illuminance threshold, so that the luminance corresponding to the grayscale 255 of the first display area obtained through adjustment is approximately equal to the luminance corresponding to the grayscale 255 of the second display area obtained through adjustment.

Figure 12:
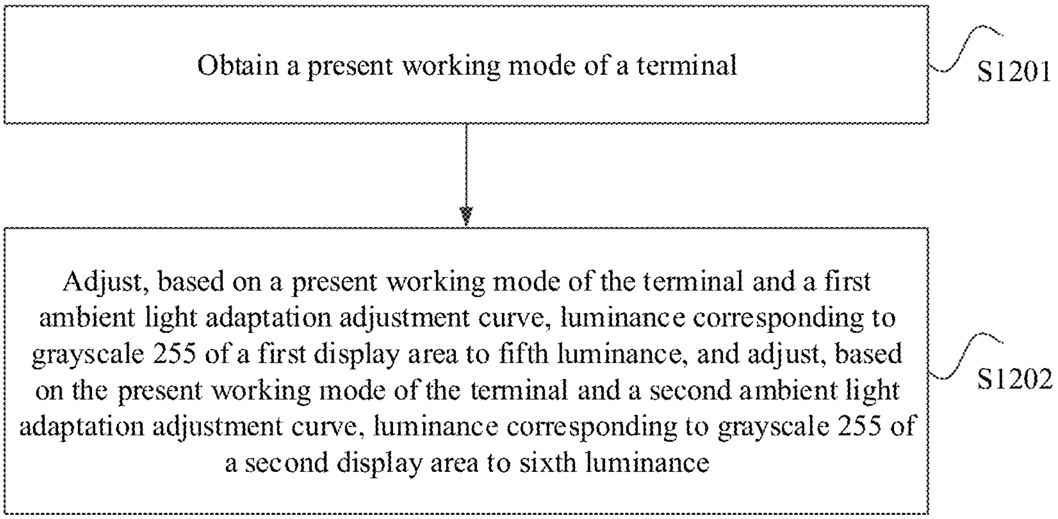
FIG. 12 is a schematic flowchart of a display screen adjustment method according to an embodiment of this application.

In a possible scenario, when the influencing factor is the present operation interface of the terminal, the luminance corresponding to the grayscale 255 of the first display area and the luminance corresponding to the grayscale 255 of the second display area may be respectively adjusted based on the present operation interface of the terminal. For example, FIG. 12 is a schematic flowchart of a display screen adjustment method according to an embodiment of this application. The display screen adjustment method may include the following operations.

S1201. Obtain a present operation interface of the terminal.

The operation interface includes any one of a screen-off operation interface, a screen-on operation interface, or a screen lock operation interface.

S1202. When the ambient illuminance is lower than the ambient illuminance threshold, adjust, based on the present operation interface of the terminal and the first ambient light adaptation adjustment curve, the luminance corresponding to the grayscale 255 of the first display area to third luminance, and adjust, based on the present operation interface of the terminal and the second ambient light adaptation adjustment curve, the luminance corresponding to the grayscale 255 of the second display area to fourth luminance.

The third luminance is approximately equal to the fourth luminance, and the third luminance is higher than or equal to the first luminance.

It may be understood that, when the luminance corresponding to the grayscale 255 of the first display area is adjusted based on the present operation interface of the terminal and the first ambient light adaptation adjustment curve, and the luminance corresponding to the grayscale 255 of the second display area is adjusted based on the present operation interface of the terminal and the second ambient light adaptation adjustment curve, the luminance corresponding to the grayscale 255 of the first display area may be first adjusted based on the first ambient light adaption adjustment curve, and the luminance corresponding to the grayscale 255 of the second display area may be first adjusted based on the second ambient light adaptation adjustment curve, to obtain the first luminance corresponding to the first display area obtained through adjustment and second luminance corresponding to the first display area obtained through adjustment. It should be noted that, in an embodiment of the application, the method for adjusting, based on the first ambient light adaptation adjustment curve, the luminance corresponding to the grayscale 255 of the first display area, and adjusting, based on the second ambient light adaptation adjustment curve, the luminance corresponding to the grayscale 255 of the second display area is similar to the method for adjusting, based on the first ambient light adaptation adjustment curve, the luminance corresponding to the grayscale 255 of the first display area, and adjusting, based on the second ambient light adaptation adjustment curve, the luminance corresponding to the grayscale 255 of the second display area in the embodiment shown in FIG. 6 or the embodiment shown in FIG. 9. Refer to related descriptions of adjusting, based on the first ambient light adaptation adjustment curve, the luminance corresponding to the grayscale 255 of the first display area, and adjusting, based on the second ambient light adaptation adjustment curve, the luminance corresponding to the grayscale 255 of the second display area in the embodiment shown in FIG. 6 or the embodiment shown in FIG. 9. Details are not described herein again in an embodiment of the application.

After the first luminance corresponding to the first display area obtained through adjustment and the second luminance corresponding to the first display area obtained through adjustment are obtained through adjusting, based on the first ambient light adaptation adjustment curve, the luminance corresponding to the grayscale 255 of the first display area, and adjusting, based on the second ambient light adaptation adjustment curve, the luminance corresponding to the grayscale 255 of the second display area, the luminance corresponding to the grayscale 255 of the first display area and the luminance corresponding to the grayscale 255 of the second display area may be further adjusted based on present operation interface of the terminal. The following describes in detail how to further adjust the luminance corresponding to the grayscale 255 of the first display area and the luminance corresponding to the grayscale 255 of the second display area for three different operation interfaces: a screen-off operation interface, a screen-on operation interface, and a screen lock operation interface.

For example, when the present operation interface of the terminal is the screen-off operation interface, it indicates that a user may have just used the mobile phone, and the user may currently be close to the terminal. In this case, screen display may be performed only at the first luminance corresponding to the grayscale 255 of the first display area and the second luminance corresponding to the grayscale 255 of the second display area that are determined based on the ambient illumination intensity, so that the user views a new message at the luminance. Certainly, if high power consumption of the terminal caused by high screen luminance is not considered, when there is a new message, to make the user easily notice the new message, the luminance corresponding to the grayscale 255 of the first display area and the luminance corresponding to the grayscale 255 of the second display area may be further increased after the first luminance corresponding to the grayscale 255 of the first display area and the second luminance corresponding to the grayscale 255 of the second display area are determined based on the ambient illumination intensity. The third luminance corresponding to the grayscale 255 of the first display area, obtained through adjustment, is approximately equal to the fourth luminance corresponding to the grayscale 255 of the second display area obtained through adjustment, so that the terminal performs screen display at the luminance obtained through adjustment. It can be learned that generally, by using the adjustment method, a problem of uneven luminance of the first display area and the second display area on a terminal screen can be resolved, so that a display effect of the terminal screen can be improved, and flexibility of terminal screen adjustment is improved because the present screen-off operation interface of the terminal can be considered.

For example, when a present operation interface of the terminal is the screen-on operation interface, whether the present screen-on operation interface is an application operation interface displayed in full screen may be further determined. When the present screen-on operation interface of the terminal is the application operation interface displayed in full screen, because the user currently may not want to be disturbed, for example, the user is playing a game or watching a video on the full screen operation interface, even if there is a new message, screen display may be implemented only at the first luminance corresponding to the grayscale 255 of the first display area and the second luminance corresponding to the grayscale 255 of the second display area that are determined based on the ambient illumination intensity, so that the user can continue to perform a full-screen operation at present luminance. Certainly, if high power consumption of the terminal caused by high screen luminance is not considered, the luminance corresponding to the grayscale 255 of the first display area and the luminance corresponding to the grayscale 255 of the second display area may be further increased after the first luminance corresponding to the grayscale 255 of the first display area and the second luminance corresponding to the grayscale 255 of the second display area are determined based on the ambient illumination intensity. The third luminance corresponding to the grayscale 255 of the first display area, obtained through adjustment, is approximately equal to the fourth luminance corresponding to the grayscale 255 of the second display area obtained through adjustment, so that the terminal performs screen display at the luminance obtained through adjustment. When the present screen-on operation interface of the terminal is an application operation interface that is not displayed in full screen, it indicates that the user is currently using the terminal to operate some applications not displayed in full screen. For example, the user is selecting a song that the user wants to listen to on a music application interface. In this case, when there is a new message, because the user can easily notice the new message in the present scenario, screen display may be implemented only at the first luminance corresponding to the grayscale 255 of the first display area and the second luminance corresponding to the grayscale 255 of the second display area that are determined based on the ambient illumination intensity, so that the user can perform a full-screen operation at the present luminance. Certainly, if high power consumption of the terminal caused by high screen luminance is not considered, to make the user easily notice the new message, the luminance corresponding to the grayscale 255 of the first display area and the luminance corresponding to the grayscale 255 of the second display area may be further increased after the first luminance corresponding to the grayscale 255 of the first display area and the second luminance corresponding to the grayscale 255 of the second display area are determined based on the ambient illumination intensity. The third luminance corresponding to the grayscale 255 of the first display area, obtained through adjustment, is approximately equal to the fourth luminance corresponding to the grayscale 255 of the second display area obtained through adjustment, so that the terminal performs screen display at the luminance obtained through adjustment. It can be learned that generally, by using the adjustment method, a problem of uneven luminance of the first display area and the second display area on the terminal screen can be resolved, so that the display effect of the terminal screen can be improved, and the flexibility of terminal screen adjustment is improved because the present screen-on operation interface of the terminal can be considered.

For example, when the present operation interface of the terminal is the screen lock operation interface, it indicates that the user is not using the terminal, and the user may currently be far away from the terminal. In this case, when there is a new message, to make the user easily notice the new message, the luminance corresponding to the grayscale 255 of the first display area and the luminance corresponding to the grayscale 255 of the second display area may be further increased after the first luminance corresponding to the grayscale 255 of the first display area and the second luminance corresponding to the grayscale 255 of the second display area are determined based on the ambient illumination intensity. The third luminance corresponding to the grayscale 255 of the first display area, obtained through adjustment, is approximately equal to the fourth luminance corresponding to the grayscale 255 of the second display area, so that the terminal performs screen display at the luminance obtained through adjustment. Certainly, in this case, screen display may be implemented only at the first luminance corresponding to the grayscale 255 of the first display area and the second luminance corresponding to the grayscale 255 of the second display area that are determined based on the ambient illumination intensity. It can be learned that generally, by using the adjustment method, a problem of uneven luminance of the first display area and the second display area on the terminal screen can be resolved, so that the display effect of the terminal screen can be improved, and the flexibility of terminal screen adjustment is improved because the present screen lock operation interface of the terminal can be considered.

It should be noted that, in this possible scenario, when the luminance corresponding to the grayscale 255 of the first display area and the luminance corresponding to the grayscale 255 of the second display area are to be further increased, it may be considered whether the first luminance corresponding to the grayscale 255 of the first display area is maximum luminance corresponding to the grayscale 255 of the first display area. If the first luminance corresponding to the grayscale 255 of the first display area is not the maximum luminance corresponding to the grayscale 255 of the first display area, the luminance corresponding to the grayscale 255 of the first display area and the luminance corresponding to the grayscale 255 of the second display area may be further increased. In this way, the third luminance corresponding to the grayscale 255 of the first display area, obtained through adjustment, is approximately equal to the fourth luminance corresponding to the grayscale 255 of the second display area. On the contrary, if the first luminance corresponding to the grayscale 255 of the first display area is the maximum luminance corresponding to the grayscale 255 of the first display area, because naked eyes are weak at sensing screen luminance of different intensities in a high-light scenario, the first luminance of the first display area may be controlled to maintain at the maximum luminance corresponding to the grayscale 255 of the first display area, and only the luminance corresponding to the grayscale 255 of the second display area is further increased, to prevent a physical capability of the first display area from being exceeded, so as to ensure security of a component in the first display area.

Figure 13:
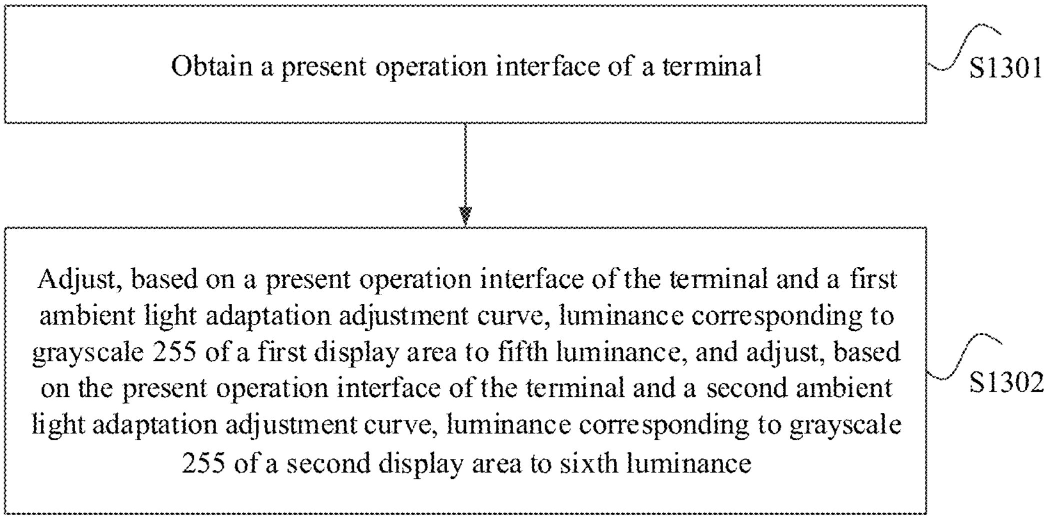
FIG. 13 is a schematic flowchart of another display screen adjustment method according to an embodiment of this application.

The foregoing embodiment shown in FIG. 12 describes in detail a technical solution of respectively adjusting, based on the present operation interface of the terminal, the luminance corresponding to the grayscale 255 of the first display area and the luminance corresponding to the grayscale 255 of the second display area, where the solution is applied in a possible scenario in which the influencing factor is the present operation interface of the terminal. The following describes in detail a technical solution of respectively adjusting, based on the present working mode of the terminal, the luminance corresponding to the grayscale 255 of the first display area and the luminance corresponding to the grayscale 255 of the second display area, where the solution is applied in another possible scenario in which the influencing factor is the present working mode of the terminal. For example, FIG. 13 is a schematic flowchart of another display screen adjustment method according to an embodiment of this application. The display screen adjustment method may include the following operations.

S1301. Obtain a present working mode of the terminal.

The present working mode of the terminal is a Do Not Disturb mode or a non-Do Not Disturb mode.

S1302. Adjust, based on the present working mode of the terminal and the first ambient light adaptation adjustment curve, the luminance corresponding to the grayscale 255 of the first display area to fifth luminance, and adjust, based on the present working mode of the terminal and the second ambient light adaptation adjustment curve, the luminance corresponding to the grayscale 255 of the second display area to sixth luminance.

The fifth luminance is approximately equal to the sixth luminance, and the fifth luminance is higher than or equal to the first luminance.

It may be understood that, when the luminance corresponding to the grayscale 255 of the first display area is adjusted based on the present working mode of the terminal and the first ambient light adaptation adjustment curve, and the luminance corresponding to the grayscale 255 of the second display area is adjusted based on the present working mode of the terminal and the second ambient light adaptation adjustment curve, the luminance corresponding to the grayscale 255 of the first display area may be first adjusted based on the first ambient light adaption adjustment curve, and the luminance corresponding to the grayscale 255 of the second display area may be first adjusted based on the second ambient light adaptation adjustment curve, to obtain the first luminance corresponding to the first display area obtained through adjustment and second luminance corresponding to the first display area obtained through adjustment. It should be noted that, in an embodiment of the application, the method for adjusting, based on the first ambient light adaptation adjustment curve, the luminance corresponding to the grayscale 255 of the first display area, and adjusting, based on the second ambient light adaptation adjustment curve, the luminance corresponding to the grayscale 255 of the second display area is similar to the method for adjusting, based on the first ambient light adaptation adjustment curve, the luminance corresponding to the grayscale 255 of the first display area, and adjusting, based on the second ambient light adaptation adjustment curve, the luminance corresponding to the grayscale 255 of the second display area in the embodiment shown in FIG. 6 or the embodiment shown in FIG. 9. Refer to related descriptions of adjusting, based on the first ambient light adaptation adjustment curve, the luminance corresponding to the grayscale 255 of the first display area, and adjusting, based on the second ambient light adaptation adjustment curve, the luminance corresponding to the grayscale 255 of the second display area in the embodiment shown in FIG. 6 or the embodiment shown in FIG. 9. Details are not described herein again in an embodiment of the application.

For example, when the present working mode of the terminal is the Do Not Disturb mode, it indicates that a user currently does not want to be disturbed. In this case, even if there is a new message, because the user currently does not want to be disturbed, screen display may be implemented only at the first luminance corresponding to the grayscale 255 of the first display area and the second luminance corresponding to the grayscale 255 of the second display area that are determined based on the ambient illumination intensity, so that the user can continue to perform a full-screen operation at present luminance. Certainly, if user experience is not considered, the luminance corresponding to the grayscale 255 of the first display area and the luminance corresponding to the grayscale 255 of the second display area may be further increased after the first luminance corresponding to the grayscale 255 of the first display area and the second luminance corresponding to the grayscale 255 of the second display area are determined based on the ambient illumination intensity. The fifth luminance corresponding to the grayscale 255 of the first display area, obtained through adjustment, is approximately equal to the sixth luminance corresponding to the grayscale 255 of the second display area obtained through adjustment, so that the terminal performs screen display at the luminance obtained through adjustment, where both the fifth luminance and the sixth luminance are higher than the first luminance. It can be learned that generally, by using the adjustment method, a problem of uneven luminance of the first display area and the second display area on the terminal screen can be resolved, so that the display effect of the terminal screen can be improved, and the flexibility of terminal screen adjustment is improved because the present Do Not Disturb mode of the terminal is considered.

For example, when the present working mode of the terminal is the non-Do Not Disturb mode, it indicates that the user currently wants to receive a new message in time. In this case, when there is a new message, to make the user easily notice the new message, the luminance corresponding to the grayscale 255 of the first display area and the luminance corresponding to the grayscale 255 of the second display area may be further increased after the first luminance corresponding to the grayscale 255 of the first display area and the second luminance corresponding to the grayscale 255 of the second display area are determined based on the ambient illumination intensity. The fifth luminance corresponding to the grayscale 255 of the first display area, obtained through adjustment, is approximately equal to the sixth luminance corresponding to the grayscale 255 of the second display area obtained through adjustment, so that the terminal performs screen display at the luminance obtained through adjustment, where both the fifth luminance and the sixth luminance are higher than the first luminance. Certainly, in this case, screen display may be implemented only at the first luminance corresponding to the grayscale 255 of the first display area and the second luminance corresponding to the grayscale 255 of the second display area that are determined based on the ambient illumination intensity. It can be learned that generally, by using the adjustment method, a problem of uneven luminance of the first display area and the second display area on the terminal screen can be resolved, so that the display effect of the terminal screen can be improved, and the flexibility of terminal screen adjustment is improved because the present non-Do Not Disturb mode of the terminal is considered.

It should be noted that, in this possible scenario, when the luminance corresponding to the grayscale 255 of the first display area and the luminance corresponding to the grayscale 255 of the second display area are to be further increased, it may be considered whether the first luminance corresponding to the grayscale 255 of the first display area is maximum luminance corresponding to the grayscale 255 of the first display area. If the first luminance corresponding to the grayscale 255 of the first display area is not the maximum luminance corresponding to the grayscale 255 of the first display area, the luminance corresponding to the grayscale 255 of the first display area and the luminance corresponding to the grayscale 255 of the second display area may be further increased. In this way, the third luminance corresponding to the grayscale 255 of the first display area, obtained through adjustment, is approximately equal to the fourth luminance corresponding to the grayscale 255 of the second display area. On the contrary, if the first luminance corresponding to the grayscale 255 of the first display area is the maximum luminance corresponding to the grayscale 255 of the first display area, because naked eyes are weak at sensing screen luminance of different intensities in a high-light scenario, the first luminance of the first display area may be controlled to maintain at the maximum luminance corresponding to the grayscale 255 of the first display area, and only the luminance corresponding to the grayscale 255 of the second display area is further increased, to prevent a physical capability of the first display area from being exceeded, so as to ensure security of a component in the first display area.

Figure 14:
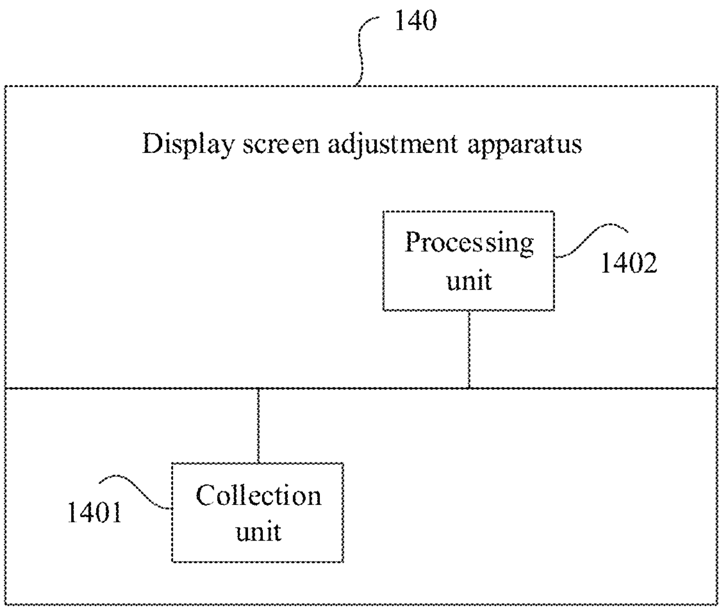
FIG. 14 is a schematic diagram of a structure of a display screen adjustment apparatus according to an embodiment of this application.

FIG. 14 is a schematic diagram of a structure of a display screen adjustment apparatus 140 according to an embodiment of this application. The apparatus is applied to a terminal. A screen of the terminal includes a first display area and a second display area, a camera component is disposed under the first display area, and light transmittance of the first display area is higher than light transmittance of the second display area. Refer to FIG. 14. The display screen adjustment apparatus 140 may include:

a collection unit 1401, configured to collect present ambient illuminance on the terminal; and a processing unit 1402, configured to: when the ambient illuminance is lower than an ambient illuminance threshold, adjust, based on a first ambient light adaptation adjustment curve, luminance corresponding to grayscale 255 of the first display area to first luminance, and adjust, based on a second ambient light adaptation adjustment curve, luminance corresponding to grayscale 255 of the second display area to second luminance, where the first luminance is approximately equal to the second luminance.

The first ambient light adaptation adjustment curve indicates a mapping relationship between ambient illuminance and the luminance corresponding to the grayscale 255 of the first display area; and the second ambient light adaptation adjustment curve indicates a mapping relationship between ambient illuminance and the luminance corresponding to the grayscale 255 of the second display area.

In an embodiment, the first ambient light adaptation adjustment curve is a curve indicating the relationship between the ambient illuminance and the luminance corresponding to the grayscale 255 of the first display area, the second ambient light adaptation adjustment curve is a curve indicating the relationship between the ambient illuminance and the luminance corresponding to the grayscale 255 of the second display area, and a slope of the first ambient light adaptation adjustment curve is approximately equal to a slope of the second ambient light adaptation adjustment curve when the ambient illuminance is lower than the ambient illuminance threshold.

In an embodiment, the processing unit 1402 is further configured to determine the second ambient light adaptation adjustment curve based on at least two groups consisted of ambient illuminance and luminance corresponding to the ambient illuminance; perform conversion on the second ambient light adaptation adjustment curve to obtain a second ratio curve, where the second ratio curve is a curve indicating a relationship between ambient illuminance and a pulse width modulation ratio corresponding to the grayscale 255 of the second display area, or the second ratio curve is a curve indicating a relationship between ambient illuminance and a current ratio corresponding to the grayscale 255 of the second display area; and obtain the first ambient light adaptation adjustment curve based on the ambient illuminance threshold, maximum luminance corresponding to the grayscale 255 of the first display area, and the second ratio curve.

In an embodiment, the processing unit 1402 is configured to: obtain a first ratio curve based on the ambient illuminance threshold, the maximum luminance corresponding to the grayscale 255 of the first display area, and the second ratio curve, where a slope of the first ratio curve is greater than a slope of the second ratio curve; and when the second ratio curve is the curve indicating the relationship between the ambient illuminance and the pulse width modulation ratio corresponding to the grayscale 255 of the second display area, the first ratio curve is a curve indicating a relationship between ambient illuminance and a pulse width modulation ratio corresponding to the grayscale 255 of the first display area; or when the second ratio curve is the curve indicating the relationship between the ambient illuminance and the current ratio corresponding to the grayscale 255 of the second display area, the first ratio curve is a curve indicating a relationship between ambient illuminance and a current ratio corresponding to the grayscale 255 of the first display area; and obtain the first ambient light adaptation adjustment curve based on the first ratio curve.

In an embodiment, the ambient illuminance threshold is ambient illuminance that is on the second ambient light adaptation adjustment curve and that corresponds to luminance equal to the maximum luminance corresponding to the grayscale 255 of the first display area.

In an embodiment, when the first ambient light adaptation adjustment curve is a first ratio curve, the second ambient light adaptation adjustment curve is a second ratio curve, and the ambient illuminance is lower than the ambient illuminance threshold, a slope of the first ratio curve is greater than a slope of the second ratio curve.

When the first ratio curve is a curve indicating a relationship between ambient illuminance and a pulse width modulation ratio corresponding to the grayscale 255 of the first display area, the second ratio curve is a curve indicating a relationship between ambient illuminance and a pulse width modulation ratio corresponding to the grayscale 255 of the second display area; or when the first ratio curve is a curve indicating a relationship between ambient illuminance and a current ratio corresponding to the grayscale 255 of the first display area, the second ratio curve is a curve indicating a relationship between ambient illuminance and a current ratio corresponding to the grayscale 255 of the second display area.

In an embodiment, the processing unit 1402 is further configured to: determine, based on at least two groups consisted of ambient illuminance and luminance corresponding to the ambient illuminance, a curve indicating a relationship between ambient illuminance and the luminance corresponding to the grayscale 255 of the second display area; perform conversion on the curve indicating the relationship between the ambient illuminance and the luminance corresponding to the grayscale 255 of the second display area, to obtain the second ratio curve; and obtain the first ratio curve based on the ambient illuminance threshold, maximum luminance corresponding to the grayscale 255 of the first display area, and the second ratio curve.

In an embodiment, the ambient illuminance threshold is ambient illuminance that is on the second ratio curve and that corresponds to a pulse width modulation ratio equal to a maximum pulse width modulation ratio corresponding to the grayscale 255 of the first display area; or the ambient illuminance threshold is ambient illuminance that is on the second ratio curve and that corresponds to a current ratio equal to a maximum current ratio corresponding to the grayscale 255 of the first display area.

In an embodiment, when the ambient illuminance is higher than or equal to the ambient illuminance threshold, the first luminance is maintained at the maximum luminance corresponding to the grayscale 255 of the first display area, and the second luminance is higher than the first luminance, and is less than or equal to maximum luminance corresponding to the grayscale 255 of the second display area.

In an embodiment, the processing unit 1402 is configured to: obtain a present operation interface of the terminal, where the operation interface includes any one of a screen-off operation interface, a screen-on operation interface, or a screen lock operation interface; and adjust, based on the present operation interface of the terminal and the first ambient light adaptation adjustment curve, the luminance corresponding to the grayscale 255 of the first display area to third luminance, and adjust, based on the present operation interface of the terminal and the second ambient light adaptation adjustment curve, the luminance corresponding to the grayscale 255 of the second display area to fourth luminance, where the third luminance is approximately equal to the fourth luminance, and the third luminance is higher than or equal to the first luminance.

In an embodiment, the processing unit 1402 is configured to: obtain a present working mode of the terminal, where the working mode is a Do Not Disturb mode or a non-Do Not Disturb mode; and adjust, based on the present working mode of the terminal and the first ambient light adaptation adjustment curve, the luminance corresponding to the grayscale 255 of the first display area to fifth luminance, and adjust, based on the present working mode of the terminal and the second ambient light adaptation adjustment curve, the luminance corresponding to the grayscale 255 of the second display area to sixth luminance, where the fifth luminance is approximately equal to the sixth luminance, and the fifth luminance is higher than or equal to the first luminance.

The display screen adjustment apparatus 140 shown in an embodiment of the application may perform the technical solution of the display screen adjustment method shown in any one of the foregoing embodiments. Implementation principles and beneficial effects of the display screen adjustment apparatus 140 are similar to those of the display screen adjustment method. Details are not described herein again.

Figure 15:
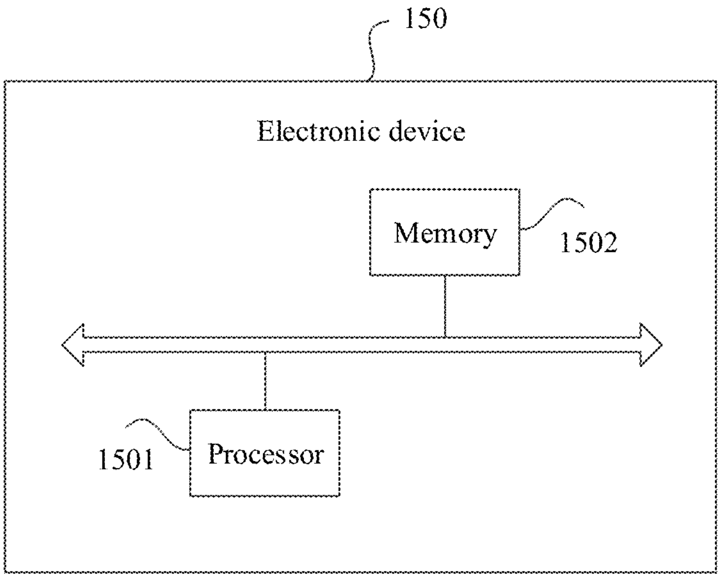
FIG. 15 is a schematic diagram of a structure of an electronic device according to an embodiment of this application.

FIG. 15 is a schematic diagram of a structure of an electronic device 150 according to an embodiment of this application. Refer to FIG. 15. For example, the electronic device 150 includes a processor 1501 and a memory 1502. The memory 1502 stores a computer program, and the processor 1501 executes the computer program stored in the memory 1502, so that the electronic device 150 performs the technical solution of the display screen adjustment method shown in any one of the foregoing embodiments. Implementation principles and beneficial effects of the electronic device 150 are similar to those of the display screen adjustment method. Details are not described herein again.

An embodiment of this application further provides an electronic device. The electronic device may include a processor and an interface circuit. The interface circuit is configured to receive code instructions and transmit the code instructions to the processor; and the processor is configured to run the code instructions to perform the technical solution of the display screen adjustment method shown in any one of the foregoing embodiments. Implementation principles and beneficial effects of the electronic device are similar to those of the display screen adjustment method. Details are not described herein again.

An embodiment of this application further provides a computer storage medium, configured to store instructions. When the instructions are executed, the display screen adjustment method shown in any one of the foregoing embodiments is performed. Implementation principles and beneficial effects of the computer storage medium are similar to those of the display screen adjustment method. Details are not described herein again.

An embodiment of this application further provides a chip. The chip stores a computer program, and when the computer program is executed by a processor, the technical solution of the display screen adjustment method shown in any one of the foregoing embodiments is performed. Implementation principles and beneficial effects of the chip are similar to those of the display screen adjustment method. Details are not described herein again.

The processor in the foregoing embodiments may be a general-purpose processor, a digital signal processor (DSP), an application specific integrated circuit (ASIC), a field programmable gate array (FPGA) or another programmable logic device, a discrete gate or a transistor logic device, or a discrete hardware component. The processor may implement or perform the methods, the operations, and the logical block diagrams that are disclosed in embodiments of this application. The general-purpose processor may be a microprocessor, or the processor may be any conventional processor or the like. The operations of the methods disclosed with reference to embodiments of this application may be directly performed and completed by a hardware decoding processor, or performed and completed by a combination of hardware and software modules in a decoding processor. The software module may be located in a mature storage medium in the art, such as a random access memory (RAM), a flash memory, a read-only memory (ROM), a programmable read-only memory, an electrically erasable programmable memory, or a register. The storage medium is located in the memory, and a processor reads instructions in the memory and completes the operations in the foregoing methods in combination with hardware of the processor.

In the several embodiments provided in this application, it should be understood that the disclosed apparatus and method may be implemented in other manners. For example, the described apparatus embodiments are merely examples. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate. The parts displayed as units may or may not be physical units, and may be located in one position, or may be distributed on a plurality of network units. Some or all of the units may be selected based on actual requirements to achieve the objectives of the solutions of embodiments.

In addition, functional units in embodiments of this application may be integrated into one processing unit, each of the units may exist alone physically, or two or more units are integrated into one unit. The integrated unit may be implemented as hardware, or may be implemented as a combination of hardware and a software functional unit.

What is claimed is:

1. A method for adjusting display screen of a terminal, comprising:

collecting present ambient illuminance on the terminal, wherein a screen of the terminal comprises a first display area and a second display area, and wherein a camera component is disposed under the first display area, and wherein light transmittance of the first display area is higher than light transmittance of the second display area; and when the ambient illuminance is lower than an ambient illuminance threshold, adjusting, based on a first ambient light adaptation adjustment curve, luminance corresponding to grayscale 255 of the first display area to first luminance, and adjusting, based on a second ambient light adaptation adjustment curve, luminance corresponding to grayscale 255 of the second display area to second luminance, wherein the first luminance is approximately equal to the second luminance, wherein the first ambient light adaptation adjustment curve indicates a mapping relationship between ambient illuminance and the luminance corresponding to the grayscale 255 of the first display area, and wherein the second ambient light adaptation adjustment curve indicates a mapping relationship between ambient illuminance and the luminance corresponding to the grayscale 255 of the second display area, and when the ambient illuminance is higher than or equal to the ambient illuminance threshold, maintaining the first luminance at a maximum luminance corresponding to the grayscale 255 of the first display area, and adjusting, based on the second ambient light adaptation adjustment curve, the luminance corresponding to the grayscale 255 of the second display area to the second luminance, wherein the second luminance is higher than the first luminance, and is less than or equal to a maximum luminance corresponding to the grayscale 255 of the second display area.

2. The method according to claim 1, wherein the first ambient light adaptation adjustment curve indicates the relationship between the ambient illuminance and the luminance corresponding to the grayscale 255 of the first display area, wherein the second ambient light adaptation adjustment curve indicates the relationship between the ambient illuminance and the luminance corresponding to the grayscale 255 of the second display area, and wherein a slope of the first ambient light adaptation adjustment curve is approximately equal to a slope of the second ambient light adaptation adjustment curve when the ambient illuminance is lower than the ambient illuminance threshold.

3. The method according to claim 2, further comprising:

determining the second ambient light adaptation adjustment curve based on at least two groups consisted of ambient illuminance and luminance corresponding to the ambient illuminance;

performing conversion on the second ambient light adaptation adjustment curve to obtain a second ratio curve indicating a relationship between ambient illuminance and a pulse width modulation ratio corresponding to the grayscale 255 of the second display area, or indicating a relationship between ambient illuminance and a current ratio corresponding to the grayscale 255 of the second display area; and obtaining the first ambient light adaptation adjustment curve based on the ambient illuminance threshold, the maximum luminance corresponding to the grayscale 255 of the first display area, and the second ratio curve.

4. The method according to claim 3, wherein the obtaining the first ambient light adaptation adjustment curve based on the ambient illuminance threshold, the maximum luminance corresponding to the grayscale 255 of the first display area, and the second ratio curve comprises:

obtaining a first ratio curve based on the ambient illuminance threshold, the maximum luminance corresponding to the grayscale 255 of the first display area, and the second ratio curve, wherein a slope of the first ratio curve is greater than a slope of the second ratio curve, wherein when the second ratio curve indicates the relationship between the ambient illuminance and the pulse width modulation ratio corresponding to the grayscale 255 of the second display area, the first ratio curve indicates a relationship between ambient illuminance and a pulse width modulation ratio corresponding to the grayscale 255 of the first display area; or when the second ratio curve indicates the relationship between the ambient illuminance and the current ratio corresponding to the grayscale 255 of the second display area, the first ratio curve indicates a relationship between ambient illuminance and a current ratio corresponding to the grayscale 255 of the first display area; and obtaining the first ambient light adaptation adjustment curve based on the first ratio curve.

5. The method according to claim 2, wherein the ambient illuminance threshold is on the second ambient light adaptation adjustment curve corresponding to luminance equal to the maximum luminance corresponding to the grayscale 255 of the first display area.

6. The method according to claim 1, wherein when the first ambient light adaptation adjustment curve is a first ratio curve, the second ambient light adaptation adjustment curve is a second ratio curve, and the ambient illuminance is lower than the ambient illuminance threshold, a slope of the first ratio curve is greater than a slope of the second ratio curve; and when the first ratio curve indicates a relationship between ambient illuminance and a pulse width modulation ratio corresponding to the grayscale 255 of the first display area, the second ratio curve indicates a relationship between ambient illuminance and a pulse width modulation ratio corresponding to the grayscale 255 of the second display area; or when the first ratio curve indicates a relationship between ambient illuminance and a current ratio corresponding to the grayscale 255 of the first display area, the second ratio curve indicates a relationship between ambient illuminance and a current ratio corresponding to the grayscale 255 of the second display area.

7. The method according to claim 6, further comprising:

determining, based on at least two groups consisted of ambient illuminance and luminance corresponding to the ambient illuminance, a curve indicating a relationship between ambient illuminance and the luminance corresponding to the grayscale 255 of the second display area;

performing conversion on the curve indicating the relationship between the ambient illuminance and the luminance corresponding to the grayscale 255 of the second display area, to obtain the second ratio curve; and obtaining the first ratio curve based on the ambient illuminance threshold, the maximum luminance corresponding to the grayscale 255 of the first display area, and the second ratio curve.

8. The method according to claim 6, wherein the ambient illuminance threshold is on the second ratio curve corresponding to a pulse width modulation ratio equal to a maximum pulse width modulation ratio corresponding to the grayscale 255 of the first display area; or the ambient illuminance threshold is on the second ratio curve corresponding to a current ratio equal to a maximum current ratio corresponding to the grayscale 255 of the first display area.

9. The method according to claim 1, wherein the adjusting the luminance corresponding to the grayscale 255 of the first display area to the first luminance, and the adjusting the luminance corresponding to the grayscale 255 of the second display area to the second luminance comprises:

obtaining a present operation interface of the terminal, wherein the operation interface comprises any one of a screen-off operation interface, a screen-on operation interface, or a screen lock operation interface; and adjusting, based on the present operation interface of the terminal and the first ambient light adaptation adjustment curve, the luminance corresponding to the grayscale 255 of the first display area to third luminance, and adjusting, based on the present operation interface of the terminal and the second ambient light adaptation adjustment curve, the luminance corresponding to the grayscale 255 of the second display area to fourth luminance, wherein the third luminance is approximately equal to the fourth luminance, and wherein the third luminance is higher than or equal to the first luminance.

10. The method according to claim 1, wherein the adjusting the luminance corresponding to the grayscale 255 of the first display area to the first luminance, and adjusting the luminance corresponding to the grayscale 255 of the second display area to the second luminance comprises:

obtaining a present working mode of the terminal, wherein the working mode is a Do Not Disturb mode or a non-Do Not Disturb mode; and adjusting, based on the present working mode of the terminal and the first ambient light adaptation adjustment curve, the luminance corresponding to the grayscale 255 of the first display area to fifth luminance, and adjusting, based on the present working mode of the terminal and the second ambient light adaptation adjustment curve, the luminance corresponding to the grayscale 255 of the second display area to sixth luminance, wherein the fifth luminance is approximately equal to the sixth luminance, and wherein the fifth luminance is higher than or equal to the first luminance.

11. An apparatus for adjusting display screen of a terminal, comprising:

a processor, and a memory coupled to the processor to store instructions, which when executed by the processor, cause the processor to:

collect present ambient illuminance on the terminal, wherein a screen of the terminal comprises a first display area and a second display area, a camera component is disposed under the first display area, light transmittance of the first display area is higher than light transmittance of the second display area, when the ambient illuminance is lower than an ambient illuminance threshold, adjust, based on a first ambient light adaptation adjustment curve, luminance corresponding to grayscale 255 of the first display area to first luminance, and adjust, based on a second ambient light adaptation adjustment curve, luminance corresponding to grayscale 255 of the second display area to second luminance, wherein the first luminance is approximately equal to the second luminance, wherein the first ambient light adaptation adjustment curve indicates a mapping relationship between ambient illuminance and the luminance corresponding to the grayscale 255 of the first display area, and wherein the second ambient light adaptation adjustment curve indicates a mapping relationship between ambient illuminance and the luminance corresponding to the grayscale 255 of the second display area, and when the ambient illuminance is higher than or equal to the ambient illuminance threshold, maintain the first luminance at a maximum luminance corresponding to the grayscale 255 of the first display area, and adjust, based on the second ambient light adaptation adjustment curve, the luminance corresponding to the grayscale 255 of the second display area to the second luminance, wherein the second luminance is higher than the first luminance, and is less than or equal to a maximum luminance corresponding to the grayscale 255 of the second display area.

12. The apparatus according to claim 11, wherein the first ambient light adaptation adjustment curve indicates the relationship between the ambient illuminance and the luminance corresponding to the grayscale 255 of the first display area, wherein the second ambient light adaptation adjustment curve indicates the relationship between the ambient illuminance and the luminance corresponding to the grayscale 255 of the second display area, and wherein a slope of the first ambient light adaptation adjustment curve is approximately equal to a slope of the second ambient light adaptation adjustment curve when the ambient illuminance is lower than the ambient illuminance threshold.

13. The apparatus according to claim 12, wherein the processor is further configured to:

determine the second ambient light adaptation adjustment curve based on at least two groups consisted of ambient illuminance and luminance corresponding to the ambient illuminance;

perform conversion on the second ambient light adaptation adjustment curve to obtain a second ratio curve indicating a relationship between ambient illuminance and a pulse width modulation ratio corresponding to the grayscale 255 of the second display area, or indicating a relationship between ambient illuminance and a current ratio corresponding to the grayscale 255 of the second display area; and obtain the first ambient light adaptation adjustment curve based on the ambient illuminance threshold, the maximum luminance corresponding to the grayscale 255 of the first display area, and the second ratio curve.

14. The apparatus according to claim 13, wherein the processor is further configured to:

obtain a first ratio curve based on the ambient illuminance threshold, the maximum luminance corresponding to the grayscale 255 of the first display area, and the second ratio curve, wherein a slope of the first ratio curve is greater than a slope of the second ratio curve, wherein when the second ratio curve indicates the relationship between the ambient illuminance and the pulse width modulation ratio corresponding to the grayscale 255 of the second display area, the first ratio curve indicates a relationship between ambient illuminance and a pulse width modulation ratio corresponding to the grayscale 255 of the first display area; or when the second ratio curve indicates the relationship between the ambient illuminance and the current ratio corresponding to the grayscale 255 of the second display area, the first ratio curve indicates a relationship between ambient illuminance and a current ratio corresponding to the grayscale 255 of the first display area; and obtain the first ambient light adaptation adjustment curve based on the first ratio curve.

15. The apparatus according to claim 12, wherein the ambient illuminance threshold is on the second ambient light adaptation adjustment curve corresponding to luminance equal to the maximum luminance corresponding to the grayscale 255 of the first display area.

16. The apparatus according to claim 11, wherein when the first ambient light adaptation adjustment curve is a first ratio curve, the second ambient light adaptation adjustment curve is a second ratio curve, and the ambient illuminance is lower than the ambient illuminance threshold, a slope of the first ratio curve is greater than a slope of the second ratio curve; and when the first ratio curve indicates a relationship between ambient illuminance and a pulse width modulation ratio corresponding to the grayscale 255 of the first display area, the second ratio curve indicates a relationship between ambient illuminance and a pulse width modulation ratio corresponding to the grayscale 255 of the second display area; or when the first ratio curve indicates a relationship between ambient illuminance and a current ratio corresponding to the grayscale 255 of the first display area, the second ratio curve indicates a relationship between ambient illuminance and a current ratio corresponding to the grayscale 255 of the second display area.

17. The apparatus according to claim 16, wherein the processor is further configured to:

determine, based on at least two groups consisted of ambient illuminance and luminance corresponding to the ambient illuminance, a curve indicating a relationship between ambient illuminance and the luminance corresponding to the grayscale 255 of the second display area;

perform conversion on the curve indicating the relationship between the ambient illuminance and the luminance corresponding to the grayscale 255 of the second display area, to obtain the second ratio curve; and obtain the first ratio curve based on the ambient illuminance threshold, the maximum luminance corresponding to the grayscale 255 of the first display area, and the second ratio curve.

18. The apparatus according to claim 16, wherein the ambient illuminance threshold is on the second ratio curve corresponding to a pulse width modulation ratio equal to a maximum pulse width modulation ratio corresponding to the grayscale 255 of the first display area; or the ambient illuminance threshold is on the second ratio curve corresponding to a current ratio equal to a maximum current ratio corresponding to the grayscale 255 of the first display area.

* * * * *